United States Patent
Chen et al.

(10) Patent No.: US 10,727,991 B2
(45) Date of Patent: Jul. 28, 2020

(54) INTEGRATING LTE AND NEW RADIO

(71) Applicant: QUALCOMM Incorporated, San Diego, CA (US)

(72) Inventors: Wanshi Chen, San Diego, CA (US); Tingfang Ji, San Diego, CA (US); Peter Gaal, San Diego, CA (US); Joseph Binamira Soriaga, San Diego, CA (US); Krishna Kiran Mukkavilli, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/710,960

(22) Filed: Sep. 21, 2017

(65) Prior Publication Data
US 2018/0083743 A1    Mar. 22, 2018

Related U.S. Application Data

(60) Provisional application No. 62/398,459, filed on Sep. 22, 2016.

(51) Int. Cl.
*H04L 5/00* (2006.01)
*H04L 1/18* (2006.01)
*H04W 52/36* (2009.01)

(52) U.S. Cl.
CPC ............ *H04L 5/001* (2013.01); *H04L 1/1854* (2013.01); *H04L 1/1861* (2013.01); *H04L 5/0055* (2013.01); *H04W 52/365* (2013.01)

(58) Field of Classification Search
CPC ..... H04L 5/001; H04L 1/1854; H04L 1/1861; H04L 5/0055; H04W 52/365
(Continued)

(56) References Cited

U.S. PATENT DOCUMENTS 8,837,358 B2   9/2014 Lunttila et al.
9,438,401 B2   9/2016 Marinier et al.
(Continued)

OTHER PUBLICATIONS

Huawei et al., "Processing Time Reduction and Related Procedures for Short TTI", 3GPP Draft; R1-166158, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051125251, Retrieved from the Internet: URL:http://www.3gpp.org/ftp/Meetings_3GPP_SYNC/RAN1/Docs/ [retrieved on Aug. 21, 2016], 9 pages.
(Continued)

*Primary Examiner* — Michael Y Mapa
(74) *Attorney, Agent, or Firm* — Patterson & Sheridan, LLP

(57) ABSTRACT

Techniques for wireless communications in a system with long term evolution (LTE) integrated with new radio (NR) are provided. A method for wireless communications includes determining a configuration of component carrier(s) (CCs) of a first radio access technology (RAT) and CC(s) of a second RAT. The method also includes identifying one of the CC(s) in the first RAT as an uplink anchor CC based on the configuration. The method further includes identifying a HARQ timing for at least one of the CC(s) of the second RAT based on at least one of a symbol duration, a transmit time interval (TTI) length or a subframe structure of the one of the CC(s) of the first RAT. The method further yet includes sending feedback to a second node in the identified uplink anchor CC for transmissions received in the CC(s) of the second RAT.

24 Claims, 19 Drawing Sheets

(58) Field of Classification Search
USPC ...... 455/24, 26, 126, 448–449, 550.1–552.1; 370/329
See application file for complete search history.

(56) References Cited

U.S. PATENT DOCUMENTS

| | | | |
|---|---|---|---|
| 9,497,007 | B2 | 11/2016 | Bergström |
| 9,729,283 | B2 | 8/2017 | Kwon et al. |
| 2011/0268048 | A1* | 11/2011 | Toskala ............... H04L 1/16 370/329 |
| 2012/0002643 | A1* | 1/2012 | Chung ............... H04J 11/0093 370/331 |
| 2012/0178494 | A1* | 7/2012 | Haim ............... H04W 52/365 455/522 |
| 2013/0343357 | A1* | 12/2013 | Lindoff ............... H04W 72/04 370/336 |
| 2016/0269943 | A1 | 9/2016 | Ji et al. |
| 2017/0331670 | A1* | 11/2017 | Parkvall ............ H04W 52/0229 |
| 2019/0222402 | A1* | 7/2019 | Yang ............... H04L 5/0082 |

OTHER PUBLICATIONS

Partial International Search Report—PCT/US2017/052926—ISA/EPO—dated Nov. 28, 2017.
Samsung: "Aggregation of NR Carriers", 3GPP Draft; R1-166806 NR CA, 3rd Generation Partnership Project (3GPP) , Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), pp. 1-3, XP051125564, Retrieved from the Internet: URL: http://www.3gpp.org/ftp/Meetings_3GPP_SYNC/RAN1/Docs/ [retrieved on Aug. 21, 2016].
International Search Report and Written Opinion—PCT/US2017/052926—ISA/EPO—dated Mar. 9, 2018.
LG Electronics: "PHR Operation for Dual Connectivity", 3GPP Draft; R2-140742 PHR Operation for Dual Connectivity, 3rd Generation Partnership Project (3GPP) , Mobile Competence Centre; 650, Route Des Lucioles; F-06921 Sophia-Antipolis Cedex; France, vol. RAN WG2, No. Prague, Czech Republic; Feb. 10, 2014-Feb. 14, 2014 Feb. 9, 2014, XP050792031, Retrieved from the Internet: URL:http://www.3gpp.org/ftp/Meetings_3GPP_SYNC/RAN2/Docs/ [retrieved on Feb. 9, 2014], 3 pages.
Mediatek: "DRX Operation for Carrier Aggregation in LTE-A", 3GPP Draft; R2-095521, 3rd Generation Partnership Project (3GPP) , Mobile Competence Centre; 650, Route Des Lucioles; F-06921 Sophia-Antipolis Cedex; France, No. Miyazaki; Oct. 12, 2009, Oct. 12, 2009, XP050390062, [retrieved on Oct. 5, 2009], 3 pages.
Vodafone Group PLC: "Uplink Operation for LTE+NR Dual Connectivity", 3GPP Draft; R2-164977, 3rd Generation Partnership Project (3GPP), Mobile Competence Centre, 650, Route Des Lucioles, F-06921 Sophia-Antipolis Cedex, France, vol. RAN WG2, No. Gothenburg; Sweden; Aug. 22, 2016-Aug. 26, 2016 Aug. 12, 2016, XP051142725, Retrieved from the Internet: URL:http://www.3gpp.org/ftp/tsg_ran/WG2_RL2/TSGR2_95/Docs/ [retrieved on Aug. 12, 2016], 2 pages.
Convida Wireless: "Control Plane Latency for Tight Interworking", R2-165591, vol. RAN WG2, No. Goteborg, Sweden; Aug. 13, 2016 [Aug. 13, 2016].

* cited by examiner

INTEGRATING LTE AND NEW RADIO

CROSS-REFERENCE TO RELATED APPLICATIONS

This application claims the benefit of U.S. Provisional Patent Application Ser. No. 62/398,459, filed Sep. 22, 2016, which is assigned to the assignee hereof and hereby expressly incorporated by reference herein.

BACKGROUND

I. Field of the Disclosure

Aspects presented herein generally relate to wireless communication systems and, more particularly, to uplink communications in a system that supports long term evolution (LTE) integrated with new radio (NR).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus for enabling uplink communications in a communication system with LTE integrated with NR are described herein.

Certain aspects of the present disclosure provide a method for wireless communication by a UE. The method generally includes determining a configuration of one or more component carriers (CCs) of a first radio access technology (RAT) and one or more CCs of a second RAT. The method also includes identifying one of the CCs of the first RAT as an uplink anchor CC based on the configuration. The method further includes identifying a hybrid automatic repeat request (HARQ) timing for at least one of the CCs of the second RAT based on at least one of a symbol duration, a transmit time interval (TTI) length or a subframe structure of the one of the CCs of the first RAT. The method further yet includes sending feedback to a node in the identified uplink anchor CC for one or more transmissions received in the one or more CCs of the second RAT.

Certain aspects of the present disclosure provide an apparatus for wireless communication. The apparatus generally includes a transmitter, at least one processor and a memory coupled to the at least one processor. The at least one processor is configured to determine a configuration of one or more CCs of a first RAT and one or more CCs of a second RAT. The at least one processor is also configured to identify one of the CCs of the first RAT as an uplink anchor CC based on the configuration. The at least one processor is further configured to identify a HARQ timing for at least one of the CCs of the second RAT based on at least one of a symbol duration, a TTI length or a subframe structure of the one of the CCs of the first RAT. The transmitter is configured to send feedback to another apparatus in the identified uplink anchor CC for one or more transmissions received in the one or more CCs of the second RAT.

Certain aspects of the present disclosure provide an apparatus for wireless communication. The apparatus generally includes means for determining a configuration of one or more CCs of a first RAT and one or more CCs of a second RAT. The apparatus also includes means for identifying one of the CCs of the first RAT as an uplink anchor CC based on the configuration. The apparatus further includes means for identifying a HARQ timing for at least one of the CCs of the second RAT based on at least one of a symbol duration, a TTI length or a subframe structure of the one of the CCs of the first RAT. The apparatus further yet includes means for sending feedback to another apparatus in the identified uplink anchor CC for one or more transmissions received in the one or more CCs of the second RAT.

Certain aspects of the present disclosure provide a computer-readable medium having computer executable code stored thereon for wireless communication by an apparatus. The computer executable code generally includes code for determining a configuration of one or more CCs of a first RAT and one or more CCs of a second RAT. The computer executable code also includes code for identifying one of the CCs of the first RAT as an uplink anchor CC based on the configuration. The computer executable code further includes code for identifying a HARQ timing for at least one of the CCs of the second RAT based on at least one of a symbol duration, a TTI length or a subframe structure of the one of the CCs of the first RAT. The computer executable code further yet includes code for sending feedback to another apparatus in the identified uplink anchor CC for one or more transmissions received in the one or more CCs of the second RAT.

Certain aspects of the present disclosure provide a method for wireless communication by a first node. The method generally includes determining, from a configuration of one or more CCs of a first RAT and one or more CCs of a second RAT, that one of the CCs of the first RAT is an uplink anchor CC. The method also includes sending one or more downlink transmissions to a second node in the one or more CCs of the second RAT. The method further includes receiving feedback, for the one or more downlink transmissions, in the determined UL anchor CC.

Certain aspects of the present disclosure provide an apparatus for wireless communication. The apparatus generally includes at least one processor, a memory coupled to the at least one processor, a receiver and a transmitter. The least one processor is configured to determine, from a configuration of one or more CCs of a first RAT and one or more CCs of a second RAT, that one of the CCs of the first RAT is an uplink anchor CC. The transmitter is configured to send one or more downlink transmissions to another apparatus in the one or more CCs of the second RAT. The receiver is configured to receive feedback, for the one or more downlink transmissions, in the determined UL anchor CC.

Certain aspects of the present disclosure provide an apparatus for wireless communication. The apparatus generally includes means for determining, from a configuration of one or more CCs of a first RAT and one or more CCs of a second RAT, that one of the CCs of the first RAT is an uplink anchor CC. The apparatus also includes means for sending one or more downlink transmissions to another apparatus in the one or more CCs of the second RAT. The apparatus further includes means for receiving feedback, for the one or more downlink transmissions, in the determined UL anchor CC.

Certain aspects of the present disclosure provide a computer-readable medium having computer executable code stored thereon for wireless communication by an apparatus. The computer executable code generally includes code for determining, from a configuration of one or more CCs of a first RAT and one or more CCs of a second RAT, that one of the CCs of the first RAT is an uplink anchor CC. The computer executable code also includes code for sending one or more downlink transmissions to another apparatus in the one or more CCs of the second RAT. The computer executable code further includes code for receiving feedback, for the one or more downlink transmissions, in the determined UL anchor CC.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method embodiments such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
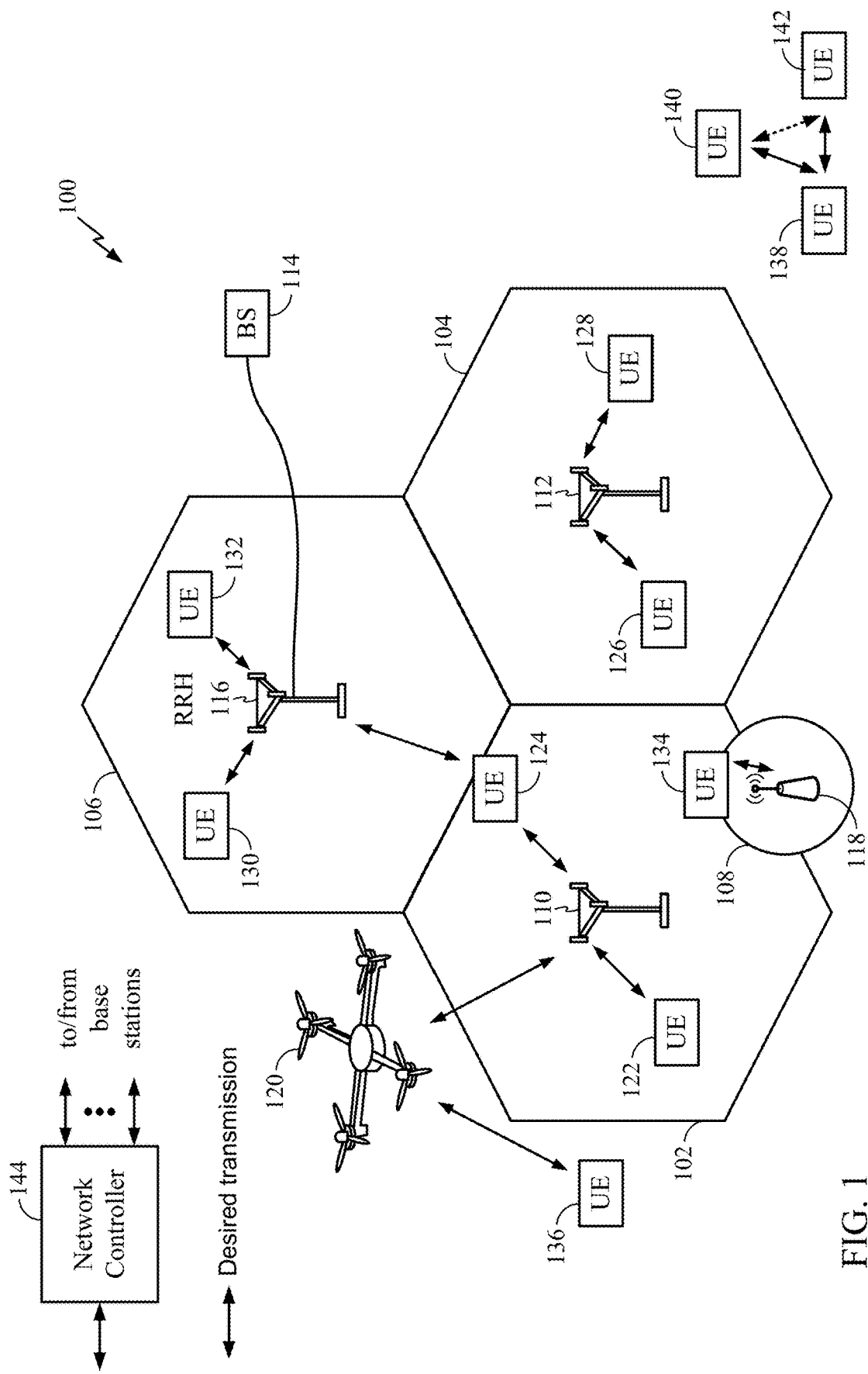
FIG. 1 is a diagram illustrating an example of an access network, in accordance with certain aspects of the present disclosure.

Aspects of the present disclosure provide apparatus, methods, processing systems, and computer program products for new radio (NR) (new radio access technology or 5G technology) integrated with LTE. NR may support various wireless communication services, such millimeter wave (mmW) targeting high carrier frequency (e.g. 60 GHz), massive multiple input multiple output (MIMO), sub-6 GHz systems, etc.

In some cases, a wireless network may support communications with different radio access technologies (RATs), such as LTE and NR. In one aspect, one or more component carriers (CCs) of LTE may be aggregated (e.g., in carrier aggregation (CA) mode) with one or more CCs of NR. In one aspect, the CCs of LTE may be in a dual-connectivity (DC) mode with CCs of NR.

As described in more detail below, a UE may determine a configuration of CCs of a first RAT and CCs of a second RAT. Based on the configuration, the UE may identify one of the CCs in the first RAT as an uplink anchor CC. The UE may send feedback to another node (e.g., UE, BS, etc.) in the identified uplink anchor CC for one or more transmissions received in CCs of the second RAT.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as NR (e.g., 5G radio access) global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communication technology under development in conjunction with the 5G Technology Forum (5GTF). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

While aspects may be described herein using terminology commonly associated with 3G and/or 4G wireless technologies, aspects of the present disclosure can be applied in other generation-based communication systems, such as 5G and later, including NR technologies.

Example Wireless Communication Network

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The network 100 may be a LTE network or some other wireless network, such as a NR or 5G network. In some aspects, access network 100 may include one or more other networks, such as a NR network. Access network 100 may include a number of Node Bs 110 (e.g., eNBs, 5G Node Bs, transmission reception points (TRPs), etc.) and other network entities (e.g., although not shown, the network 100 may include a central unit (CU) and distributed units (DUs)).

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, a distributed unit, a TRP, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

In NR systems, the term "cell" and Node B, 5G NB, or TRP may be interchangeable. In some examples, a cell may not be necessarily be stationary, and the geographic area of the cell may move according to the location of a mobile base station. For example, FIG. 1 further includes a quadcopter or drone 120, which may be configured to function as a base station. In some examples, the base stations may be interconnected to one another and/or to one or more other base stations or network nodes (not shown) in the access network 100 through various types of backhaul interfaces such as a direct physical connection, a virtual network, or the like using any suitable transport network. For example, the access network 100 may include a network controller 144 that may couple to a set of base stations and provide coordination and control for these base stations. The network controller 144 may communicate with the base stations 110, 112, 114, 118, 120 via a backhaul. The base stations 110, 112, 114, 118, 120 may also communicate with one another, e.g., directly or indirectly via wireless or wireline backhaul.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
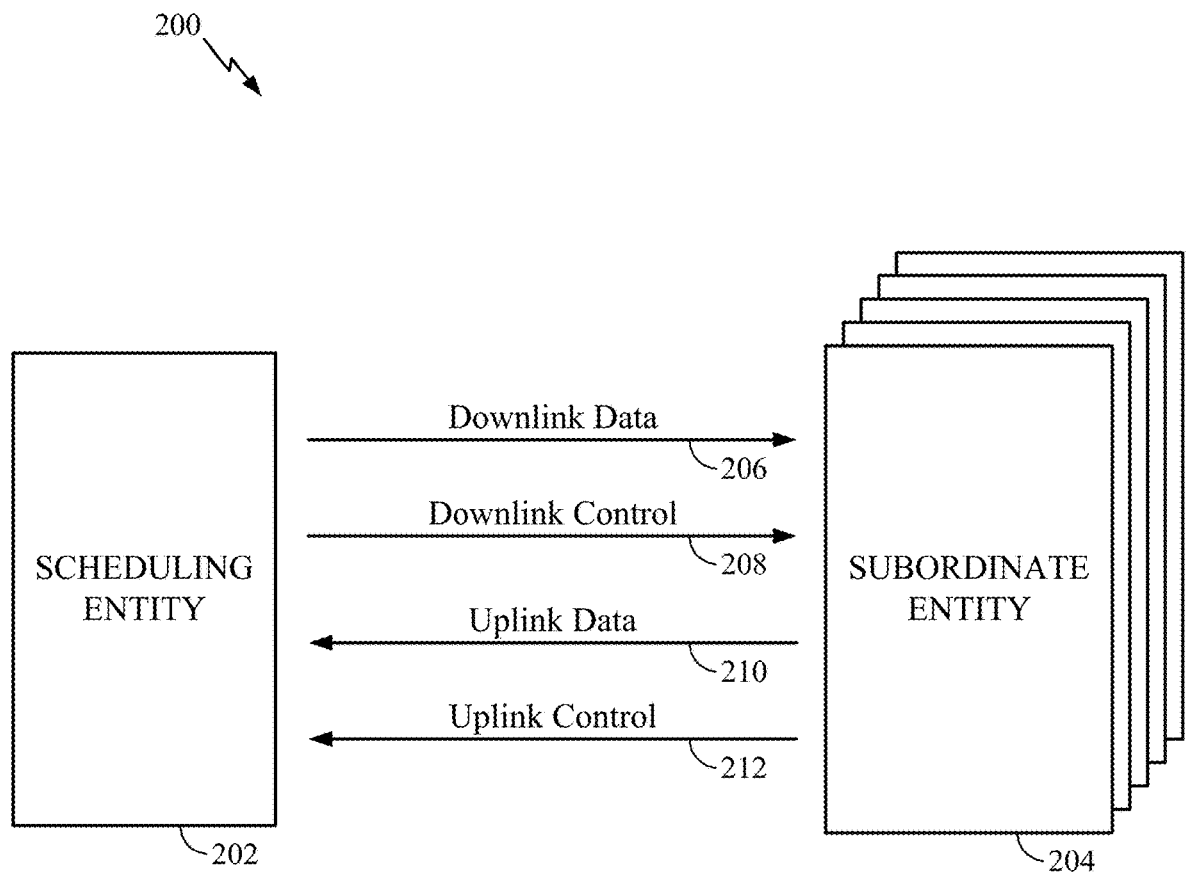
FIG. 2 is a diagram conceptually illustrating an example of a scheduling entity communicating with one or more subordinate entities, in accordance with certain aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast downlink data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information (UCI) 212 to the scheduling entity 202. Uplink control information may include a variety of packet types and categories, including pilots, reference signals, and information configured to enable or assist in decoding uplink data transmissions. In one example, uplink control information (UCI) is transferred by the physical uplink control channel (PUCCH). In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
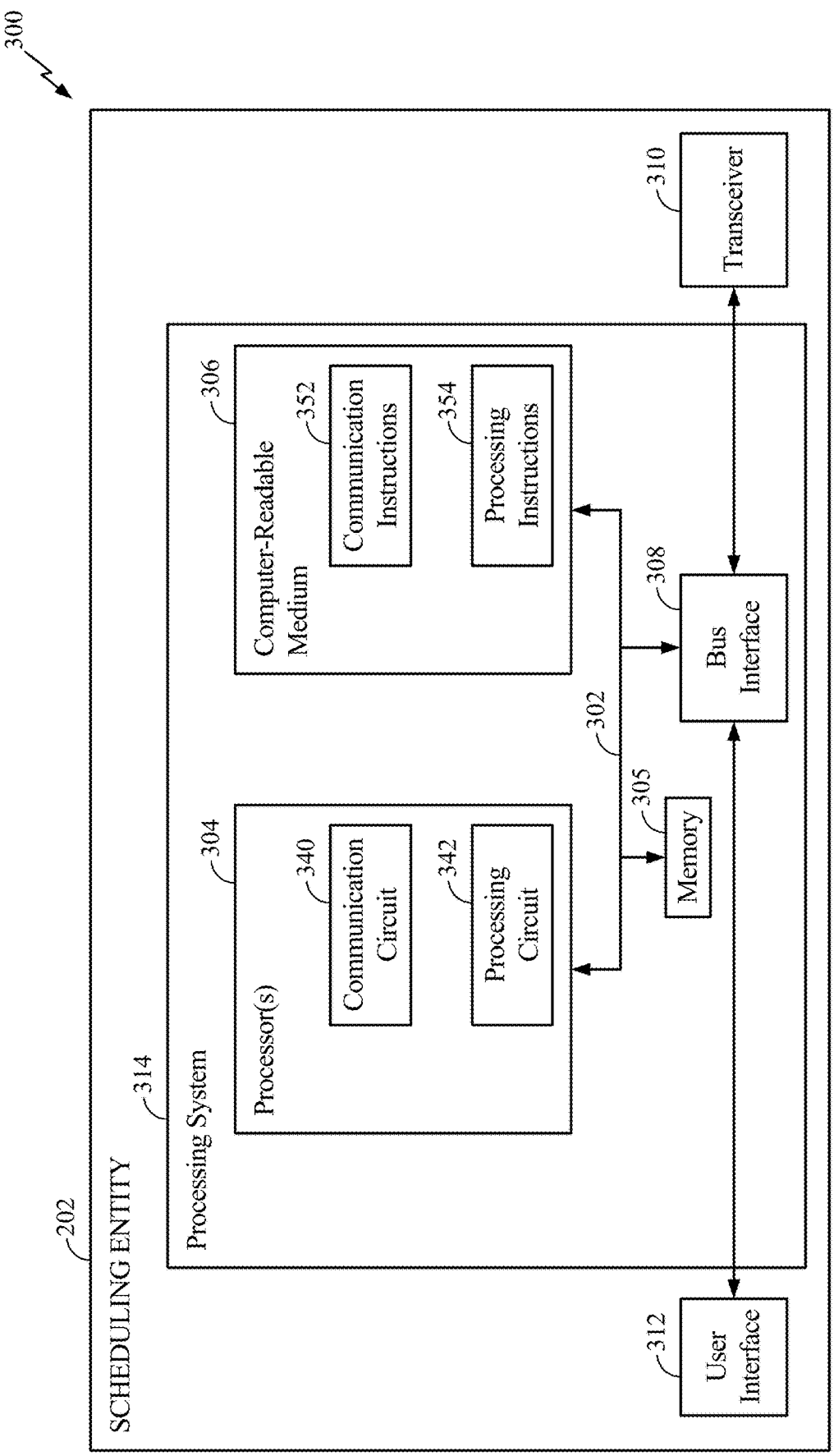
FIG. 3 is a diagram illustrating an example of a hardware implementation for a scheduling entity, in accordance with certain aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein, for example, in FIG. 11.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
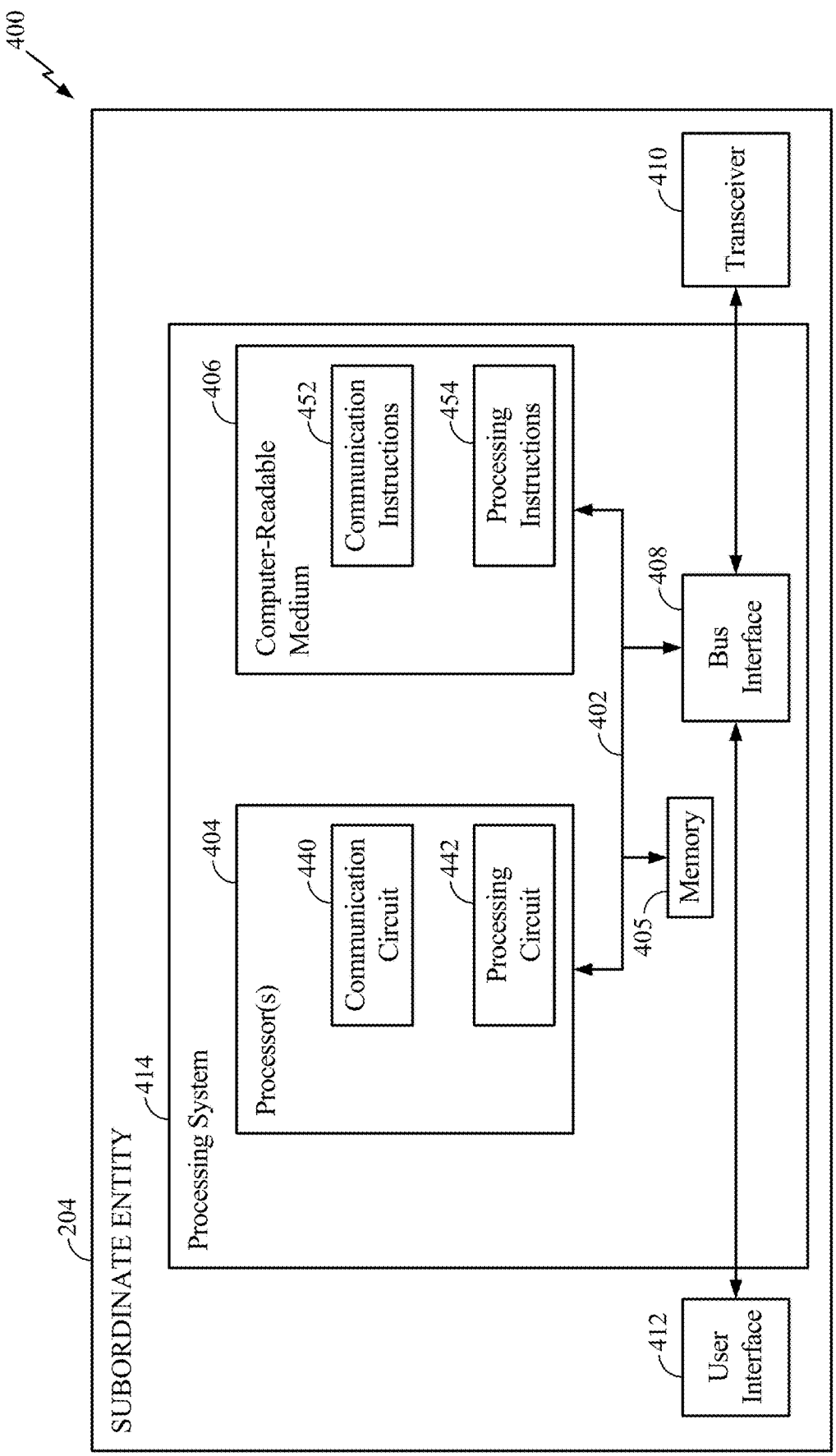
FIG. 4 is a diagram illustrating an example of a hardware implementation for a subordinate entity, in accordance with certain aspects of the present disclosure.

FIG. 4 is a diagram 400 illustrating an example of a hardware implementation for subordinate entity 204 according to aspects of the present disclosure. Subordinate entity 204 may employ a processing system 414. Subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein, for example, in FIG. 10.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

In some networks (e.g., NR or 5G networks), devices may communicate by transmitting signals in different locations of a subframe, e.g., such as in DL centric subframes and/or UL centric subframes. A DL centric subframe may be used for transmitting DL data from the base station to one or more UEs, and a UL centric subframe may be used for transmitting UL data from one or more UEs to a base station.

Figure 5A:
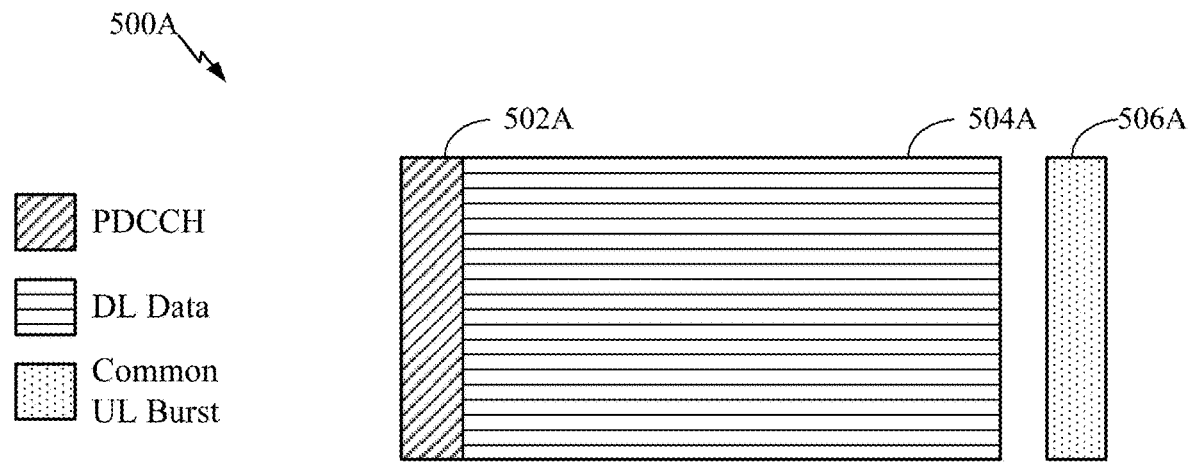
FIG. 5A is a diagram illustrating an example of a downlink (DL)-centric subframe, in accordance with certain aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, UE, BS, Node B, 5G NB, TRP, etc.) to the subordinate entity 204 (e.g., UE). In some configurations, the DL data portion 504A may be a physical DL shared channel (PDSCH).

The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity 204 (e.g., UE)) to UL communication (e.g., transmission by the subordinate entity 204 (e.g., UE)). One of ordinary skill in the art will understand, however, that the foregoing is merely one example of a DL-centric subframe and alternative structures having similar features may exist without necessarily deviating from the aspects described herein.

Figure 5B:
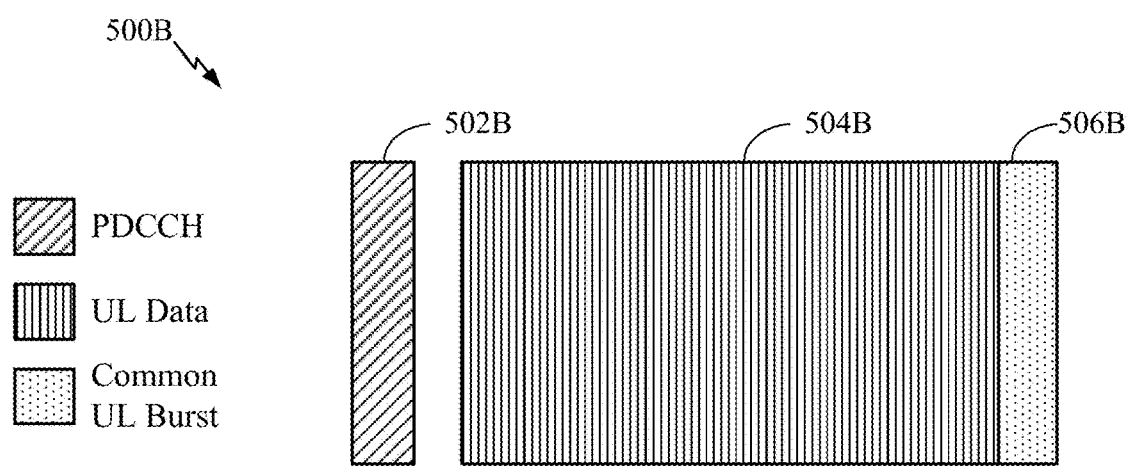
FIG. 5B is a diagram illustrating an example of an uplink (UL)-centric subframe, in accordance with certain aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity 204 (e.g., UE) to the scheduling entity 202 (e.g., eNB). In some configurations, the control portion 502B may be a physical DL control channel (PDCCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202 (e.g., UE)) to UL communication (e.g., transmission by the scheduling entity 202 (e.g., UE)). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity 204 (e.g., $UE_1$) to another subordinate entity 204 (e.g., $UE_2$) without relaying that communication through the scheduling entity 202 (e.g., eNB), even though the scheduling entity 202 (e.g., eNB) may be utilized for scheduling and/or control purposes. In some examples, the sidelink signals may be communicated using a licensed spectrum (unlike wireless local area networks, which typically use an unlicensed spectrum).

Example Carrier Aggregation

Figure 6:
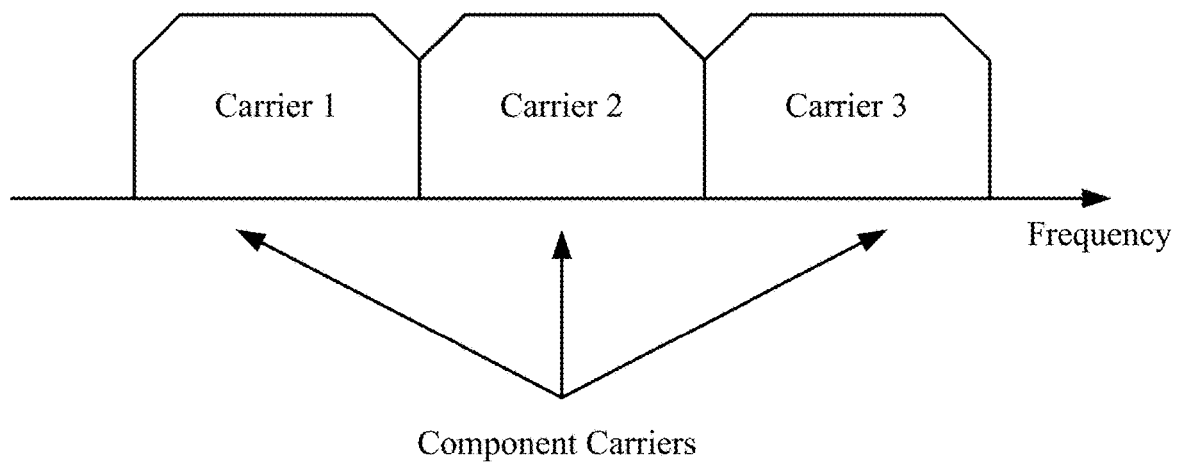
FIG. 6 illustrates an example continuous carrier aggregation type, in accordance with certain aspects of the present disclosure.
Figure 7:
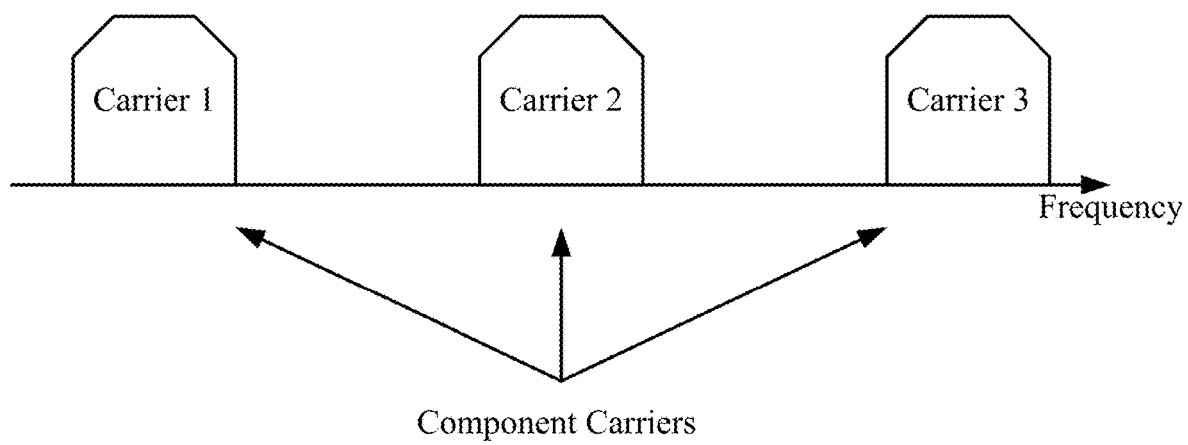
FIG. 7 illustrates an example non-continuous carrier aggregation type, in accordance with certain aspects of the present disclosure.

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA, which are illustrated in FIGS. 6 and 7. Continuous CA occurs when multiple available component carriers are adjacent to each other, for example, as illustrated in FIG. 6. On the other hand, non-continuous CA occurs when multiple available component carriers are separated along the frequency band, for example as illustrated in FIG. 7. Both non-continuous and continuous CA aggregates multiple component carriers to serve a single UE (e.g., one or more of the UEs illustrated in FIG. 1).

According to various aspects, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

It should be noted that while the preceding specifically refers to CA for LTE-Advanced UEs, the same general concept of CA applies to other types of UEs and base stations (e.g., BSs/UEs configured to operate in a new radio (NR) system according to a 5G specification), for example as explained in greater detail below.

Example Dual Connectivity

Presently, mobiles devices (e.g., UEs) receive data from one base station (e.g., eNB). However, users on a cell edge may experience high inter-cell interference which may limit the data rates. Multiflow allows users to receive data from two eNBs simultaneously. For example, the UE sends and receives data from the two eNBs in two separate streams when the UE is in range of two cell towers in two adjacent cells at the same time. The UE communicates with the two towers simultaneously when the UE is on the edge of either towers' reach. By scheduling two independent data streams to the UE from two different eNBs at the same time, multiflow exploits uneven loading in networks. This helps improve the cell-edge user experience while increasing network capacity. In one example, throughput data speeds for users at a cell edge may double. "Multiflow" is similar to dual-carrier HSPA, however, there are differences. For example, dual-carrier HSPA does not allow for connectivity to multiple towers to connect simultaneously to a device.

Dual connectivity may have benefits in the cellular industry. Dual connectivity can significantly improve per-user throughput and mobility robustness by allowing users to be connected simultaneously to master cell group (MCG) and secondary cell group (SCG) via MeNB (master eNB) and SeNB (secondary eNB), respectively. The increase in per-user throughput is achieved by aggregating radio resources from at least two eNBs (e.g., one or more of the eNBs illustrated in FIG. 1). Moreover, dual connectivity also helps in load balancing between MCG and SCG.

The MeNB and SeNB may not be collocated and can be connected via a non-ideal backhaul (e.g., backhaul). Thus, the different eNBs may use different schedulers, etc. For example, the UE (e.g., one or more of the UEs illustrated in FIG. 1) may be dually connected to the macro cell and the small cell, and the eNBs may be connected via a non-ideal backhaul and operate on different carrier frequencies. With carrier aggregation, multiple LTE/component carriers are aggregated to serve a single UE (e.g., one or more of the UEs illustrated in FIG. 1).

In certain aspects, due to the distributed nature of this deployment scenario (separate eNBs connected via a non-ideal backhaul) separate uplink control channels for both eNBs (MeNB and SeNB) are used to support distributed scheduling and independent MAC (Medium Access Control) operation across eNBs. This is unlike CA (Carrier Aggregation) deployment, in which a single MAC/scheduling entity operates across all the carriers and a single uplink control channel is used.

In certain systems, the Primary Cell (PCell of MeNB) is the only cell carrying the uplink control channels (e.g., the PUCCH). For dual connectivity, a special cell on the SeNB may support the uplink control channels for the SeNB. Also, with dual connectivity uplink control channels for both the MeNB and the SeNB are used, one for each eNB.

Example NR Architecture

Figure 8:
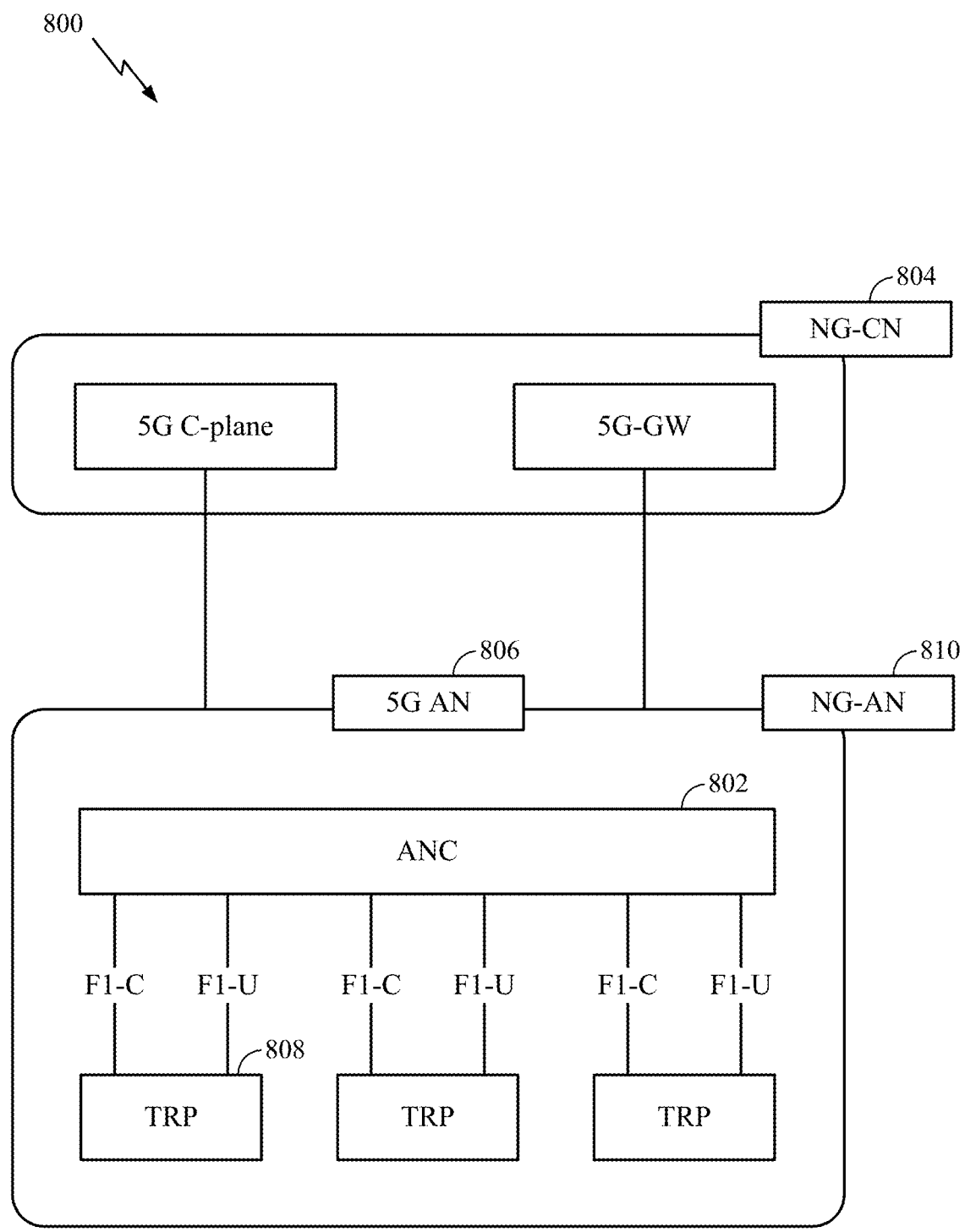
FIG. 8 illustrates a logical architecture of a distributed radio access network (RAN), in accordance with certain aspects of the present disclosure.

FIG. 8 illustrates an example logical architecture of a distributed RAN 800, according to aspects of the present disclosure. A 5G access node 806 may include an access node controller (ANC) 802. The ANC may be a central unit (CU) of the distributed RAN 800. The backhaul interface to the next generation core network (NG-CN) 804 may terminate at the ANC. The backhaul interface to neighboring next generation access nodes (NG-ANs) may terminate at the ANC. The ANC may include one or more TRPs 808 (which may also be referred to as Node Bs, 5G NB, or some other term). As described above, a TRP may be used interchangeably with "cell."

The TRPs 808 may be a distributed unit (DU). The TRPs may be connected to one ANC (ANC 802) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 800 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 810 may support dual connectivity with NR. The NG-AN may share a common fronthaul for LTE and NR.

The architecture may enable cooperation between and among TRPs 808. For example, cooperation may be preset within a TRP and/or across TRPs via the ANC 802. According to aspects, no inter-TRP interface may be needed/present.

According to aspects, a dynamic configuration of split logical functions may be present within the architecture 800. The PDCP, RLC, MAC protocol may be adaptably placed at the ANC or TRP.

Figure 9:
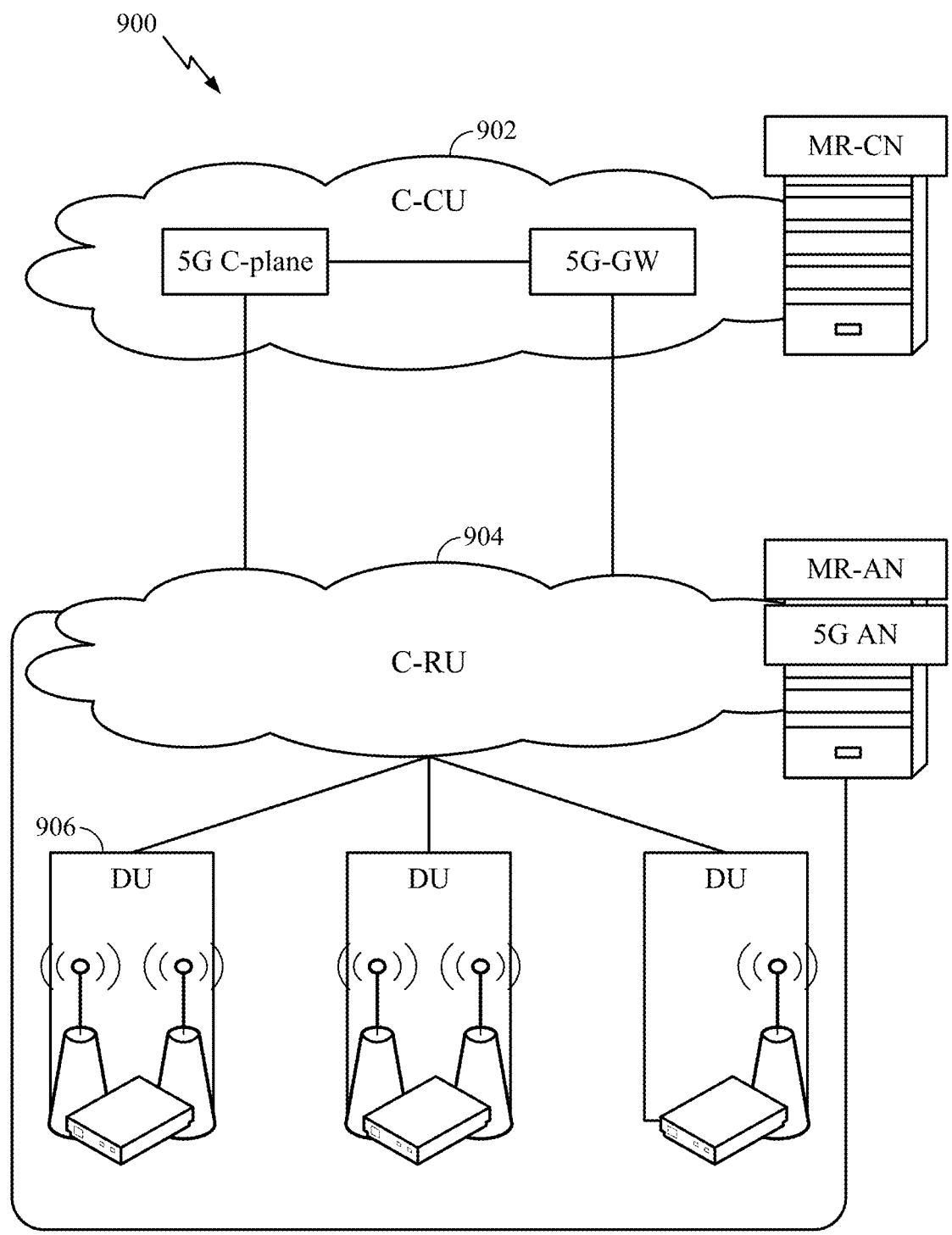
FIG. 9 illustrates an example physical architecture of a distributed RAN, in accordance with certain aspects of the present disclosure.

FIG. 9 illustrates an example physical architecture of a distributed RAN 900, according to aspects of the present disclosure. A centralized core network unit (C-CU) 902 may host core network functions. The C-CU may be centrally deployed. C-CU functionality may be offloaded (e.g., to advanced wireless services (AWS)), in an effort to handle peak capacity.

A centralized RAN unit (C-RU) 904 may host one or more ANC functions. Optionally, the C-RU may host core network functions locally. The C-RU may have distributed deployment. The C-RU may be closer to the network edge.

A distributed unit (DU) 906 may host one or more TRPs. The DU may be located at edges of the network with radio frequency (RF) functionality.

Example Integration of LTE with NR

Aspects of the present disclosure provide techniques for facilitating communications in a system that supports different radio access technologies (RATs) (e.g., such as LTE and NR).

As mentioned above, new radio (NR) may refer to radios configured to operate according a wireless standard, such as 5G (e.g. access network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

According to certain aspects, base stations/UEs configured to operate in a communication system that supports LTE and NR may use similar techniques for carrier aggregation (CA) and/or dual connectivity (DC), as described above, for communicating in the system.

CA was first introduced in LTE Release 10, in which a UE was able to communicate with a base station by aggregating two different frequency division duplexing (FDD) component carriers (CCs) or two different time division duplexing (TDD) CCs (e.g., where the two TDD CCs were of a same subframe configuration). In LTE Release 11, CA was further enhanced by allowing a UE to aggregate TDD CCs of different subframe configurations. Additionally, in LTE Release 12, FDD+TDD carrier aggregation was introduced, which allowed a UE to aggregate a FDD CC with a TDD CC to communicate with a base station. Further, LTE Release 12 introduced dual connectivity (DC), in which a UE may communicate with two different base stations using two different groups of CCs. Further, in LTE Release 13, CA was further enhanced by allowing a UE to aggregate more than five CCs, for example, up to 32 CCs. LTE Release 14 allowed certain devices to support low latency (or ultra low latency "ULL") capability, including the capability to perform certain procedures with low latency relative to devices that lack the capability (e.g., "legacy" devices). For example, devices may be able to perform low latency operation with shortened TTI (sTTI) (e.g., less than 1 ms). With the introduction of sTTI, it may be possible to have CA with sTTI and regular subframes (e.g., 1 ms). Nevertheless, while there have been many enhancements, CA and DC in LTE has generally been limited to using CCs with a same subframe structure and numerology.

NR systems, however, are expected to cover a wide range of carrier frequencies. NR may cover different subframe durations and numerologies. For example, NR systems are expected to allow communication using sub-6 GHz CCs, mmW CCs, and more. Each of these different CCs may have different subframe durations (e.g., 0.5 ms, 0.25 ms, etc.) and different, scalable numerologies/tone spacings (e.g., 15 kHz, 30 kHz, 60 kHz, 120 kHz, etc.). Scalable numerologies also include scalable TTIs. Accordingly, carrier aggregation/dual connectivity for NR may be used with different numerologies in different CCs configured for a UE.

According to certain aspects, in cases where a system supports the integration of two different RATs, such as LTE and NR, (e.g., during CA, DC, or some other activity) there may situations where the UE performs a single uplink operation at any given time between the two RATs. Put differently, with reference to LTE and NR in CA as an example, although there may be a plurality of CCs aggregated together among the two different RATs, there may a single uplink CC configured for or used by the UE.

Figure 10:
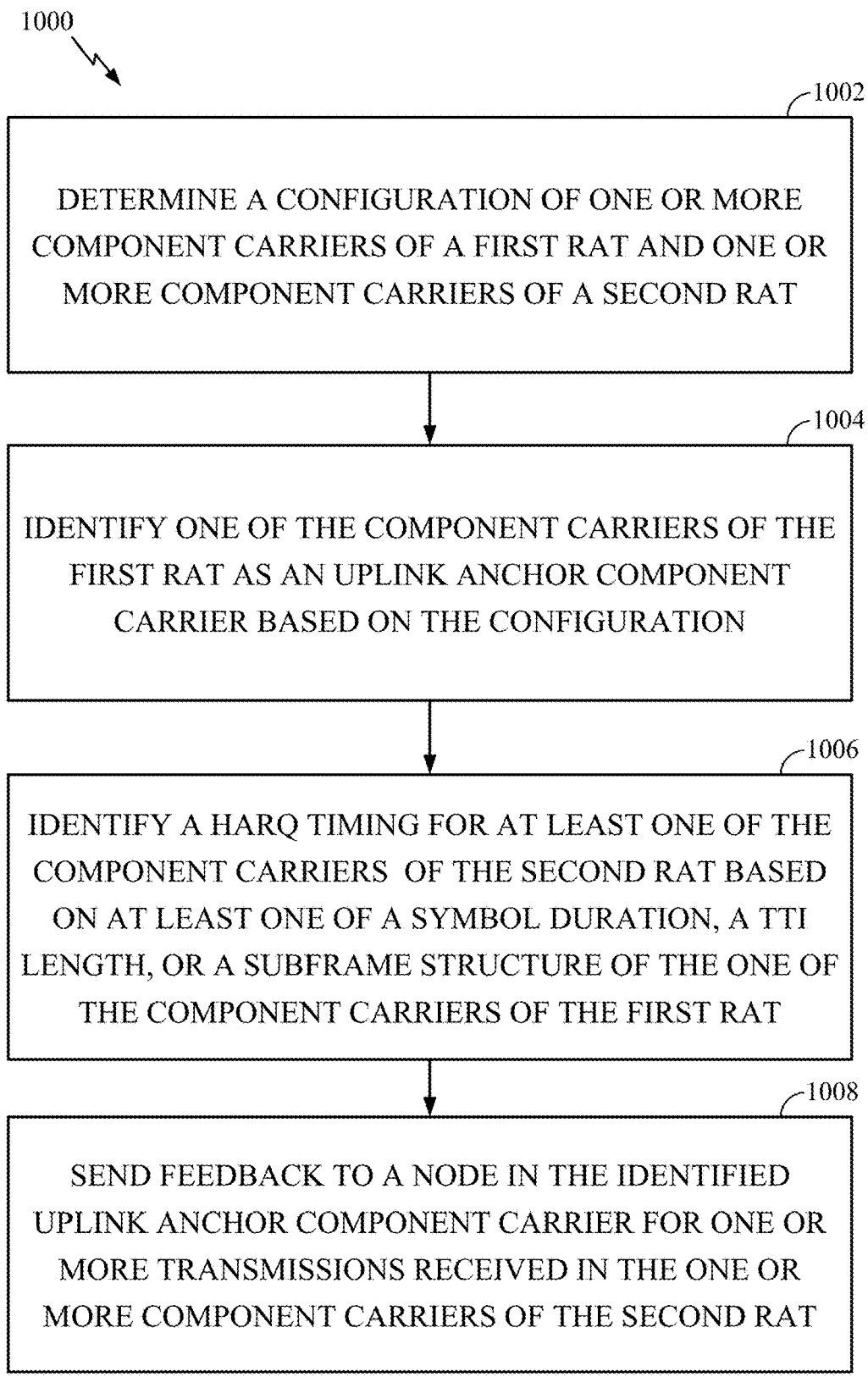
FIG. 10 is a flow diagram illustrating example operations for wireless communications by an apparatus, in accordance with certain aspects of the present disclosure.

FIG. 10 illustrates example operations 1000 for wireless communication in a wireless communications network (e.g., access network 100), according to aspects of the present disclosure. Operations 1000 may be performed, for example, by a wireless communications device, such as a UE (e.g., one or more of the UEs illustrated in FIG. 1 and/or the subordinate entity 204).

Operations 1000 begin at 1002 where the UE determines a configuration of one or more CCs of a first RAT and one or more CCs of a second RAT (e.g., for communications in the access network 100). At 1004, the UE identifies one of the CCs of the first RAT as an uplink anchor CC based on the configuration. At 1006, the UE identifies a HARQ timing for at least one of the CCs of the second RAT based on at least one of a symbol duration, a TTI length, or a subframe structure of the one of the CCs of the first RAT. At 1008, the UE sends feedback to a node (e.g., one or more of the base stations illustrated in FIG. 1, scheduling entity 220, one or more of the UEs illustrated in FIG. 1, subordinate entity 204, etc.) in the identified uplink anchor CC for one or more transmissions received from the node in the one or more CCs of the second RAT. In certain aspects, the UE may receive the one or more transmissions in one or more of the CCs of the first RAT, except for or in addition to the determined UL anchor CC. In certain aspects, the UE may transmit the feedback (e.g., HARQ feedback) as part of a HARQ process.

Figure 11:
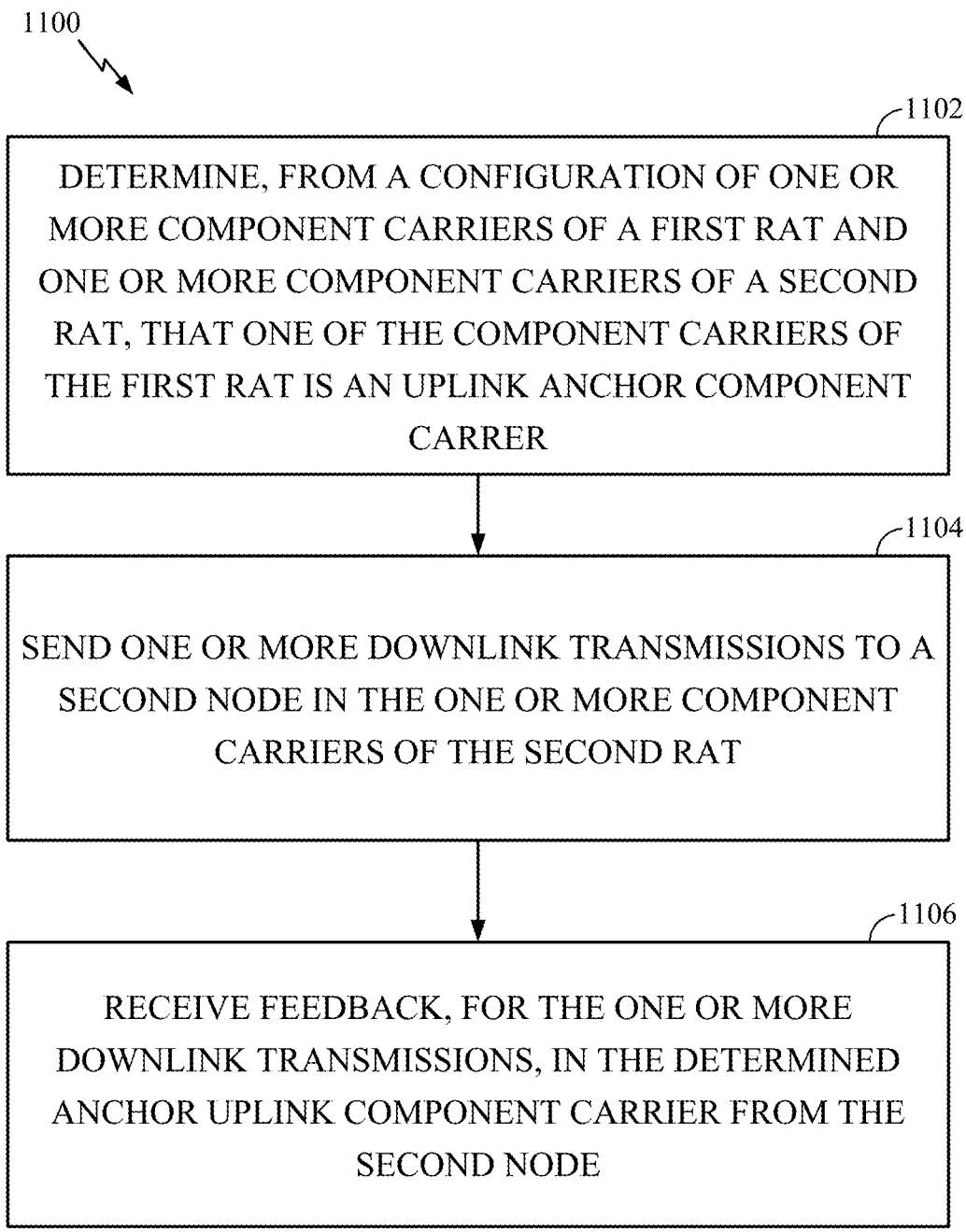
FIG. 11 is a flow diagram illustrating example operations for wireless communications by an apparatus, in accordance with certain aspects of the present disclosure.

FIG. 11 illustrates example operations 1100 for wireless communication in a wireless communications network (e.g., access network 100), according to aspects of the present disclosure. Operations 1100 may be performed, for example, by a first node. The first node may be a wireless communications device, such as a BS (e.g., one or more of the base stations 110, 112, 114, 118, and 120, and/or a scheduling entity 220) or UE (e.g., one or more of the UEs illustrated in FIG. 1 and/or the subordinate entity 204).

Operations 1100 begin at 1102 where the first node determines, from a configuration of one or more CCs of a first RAT and one or more CCs of a second RAT, that one of the CCs of the first RAT is an uplink anchor CC. At 1104, the first node sends one or more downlink transmissions to a second node (e.g., one or more of the UEs illustrated in FIG. 1, the subordinate entity 204, one or more of the BSs illustrated in FIG. 1, scheduling entity 220, etc.) in the one or more CCs of the second RAT. In some aspects, the first node may send one or more downlink transmissions to the second node in the one or more CCs of the first RAT, except for or in addition to the determined anchor CC. At 1106, the first node receives feedback, for the one or more downlink transmissions, in the determined UL anchor CC. In certain aspects, the first node may receive the feedback (e.g., HARQ feedback) as part of a HARQ process.

According to certain aspects, the first RAT may be LTE and the second RAT may be NR. Thus, in such cases, one of the CCs in LTE may be used as the UL anchor CC. In another example, one of the CCs in NR may be used as the UL anchor CC. The UE and/or BS may determine, from the configuration, that different combinations of multiplexing and multiple access technologies are supported by the CCs in the different RATs. For example, the CCs from LTE may use FDD, TDD, frame structure 3 (FS3), etc. Similarly, the CCs from NR may use FDD, TDD, unlicensed and/or shared spectrum with DL/UL centric subframes, different tone spaces, etc. In some cases, while the UE may be configured with one of the CCs in LTE as the UL anchor CC, the UE may be able to still transmit SRS in another UL CC (e.g., from NR) for channel reciprocity based operation. To do so, the UE can use a separate phase locked loop (PLL) circuit (e.g., for a NR UL CC) to minimize RF re-tuning.

When using a single UL anchor CC in LTE, there may be one or more timing considerations for providing HARQ feedback for transmissions received in the NR CCs. Aspects presented herein allow the UE to achieve same or better HARQ performance when providing HARQ feedback for NR (with LTE as the UL anchor CC) as when providing HARQ feedback for NR (with NR as the UL anchor CC).

In one aspect, for example, the UE may receive transmissions in a first subframe of one of the CCs of the second RAT (e.g., NR) and determine whether to send the feedback for the received transmissions in the UL anchor CC during the first subframe or during a second subframe or other subsequent subframe(s) of the CC of the second RAT. The UE may make such a determination based on at least one of a subframe structure, subframe duration symbol duration, a transmit time interval (TTI) duration, guard period and/or other numerology criteria associated with the CCs of the different (e.g., first and/or second) RATs.

Figure 12:
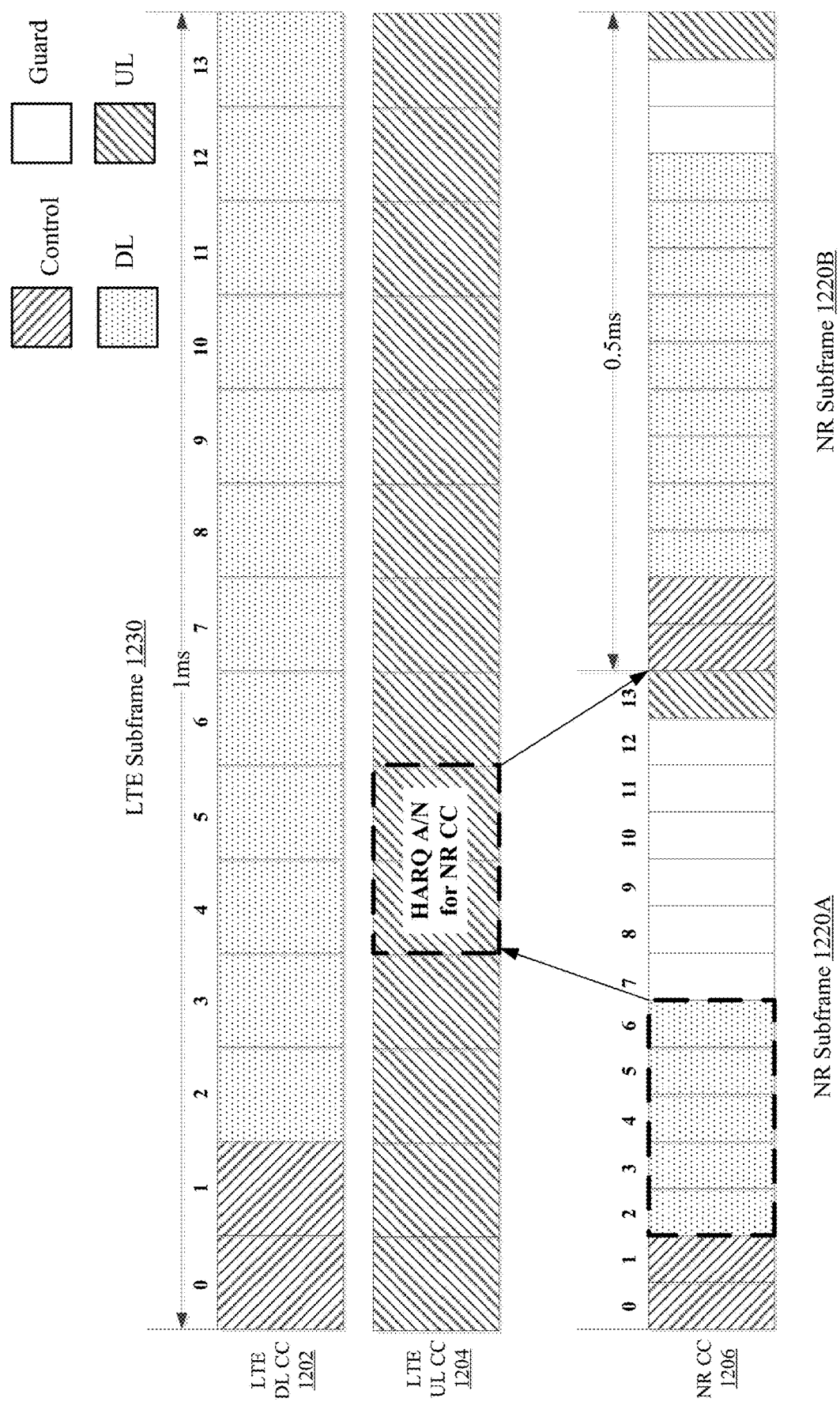
FIG. 12 illustrates an example of providing same subframe hybrid automatic repeat request (HARQ) feedback for a NR CC, in accordance with certain aspects of the present disclosure.

FIG. 12 illustrates one example of the UE providing same subframe HARQ feedback for transmissions received from another node (e.g., BS, UE, etc.) in a NR CC, according to certain aspects of the present disclosure. In this example, one FDD CC in LTE, which is comprised of a DL CC 1202 and an UL CC 1204, is aggregated with a single CC 1206 in NR, and the LTE UL CC 1204 is configured as the UL anchor CC. The numerology associated with the CCs in LTE may be different from the numerology associated with the CCs in NR. For example, as shown, the subframe duration of LTE subframe 1230 for the FDD CC in LTE is 1 ms (with 14 symbols, symbols 0 to 13) compared to a subframe duration of 0.5 ms (with 14 symbols, symbols 0 to 13) for each of NR subframes 1220A and 1220B of the CC 1206 in NR.

In one aspect, the UE may determine to send HARQ feedback during the same subframe of the NR CC in which the UE received transmissions from the other node (e.g., BS, UE, etc.), based on a guard period configured for the NR subframe and/or symbol duration configured for LTE. That is, in one case, if the UE determines that the guard period configured for the NR subframe satisfies a predetermined threshold and the symbol duration or a transmit time interval (TTI) configured for LTE satisfies a predetermined threshold, the UE may determine to send HARQ feedback in the same subframe in which the transmissions were received. As shown in FIG. 12, for example, when a large guard period (shown as 6 blank symbols, symbols 7 to 12) is configured for NR in the subframe 1220A and a 2 symbol TTI (or 1 symbol TTI) is configured for LTE, the UE may determine to send a HARQ feedback response on the LTE UL CC during the same subframe of the NR CC in which the transmissions were received. Thus, in this example, the UE receives transmissions (e.g., from a UE, BS, etc.) in symbols 2-6 of NR subframe 1220A and determines to send a HARQ feedback response (for the transmissions received in symbols 2-6 of NR subframe 1220A) in symbols 4-5 of LTE UL CC 1204 during the same NR subframe 1220A.

In cases where a large guard period is not configured for subframes of the NR CC, it may be difficult to send same subframe HARQ feedback for a NR CC (e.g., given the relatively short subframe durations typically associated with NR). Thus, in such cases, with the techniques presented herein, the UE may be able to send a HARQ feedback response in a next (or subsequent) subframe.

Figure 13:
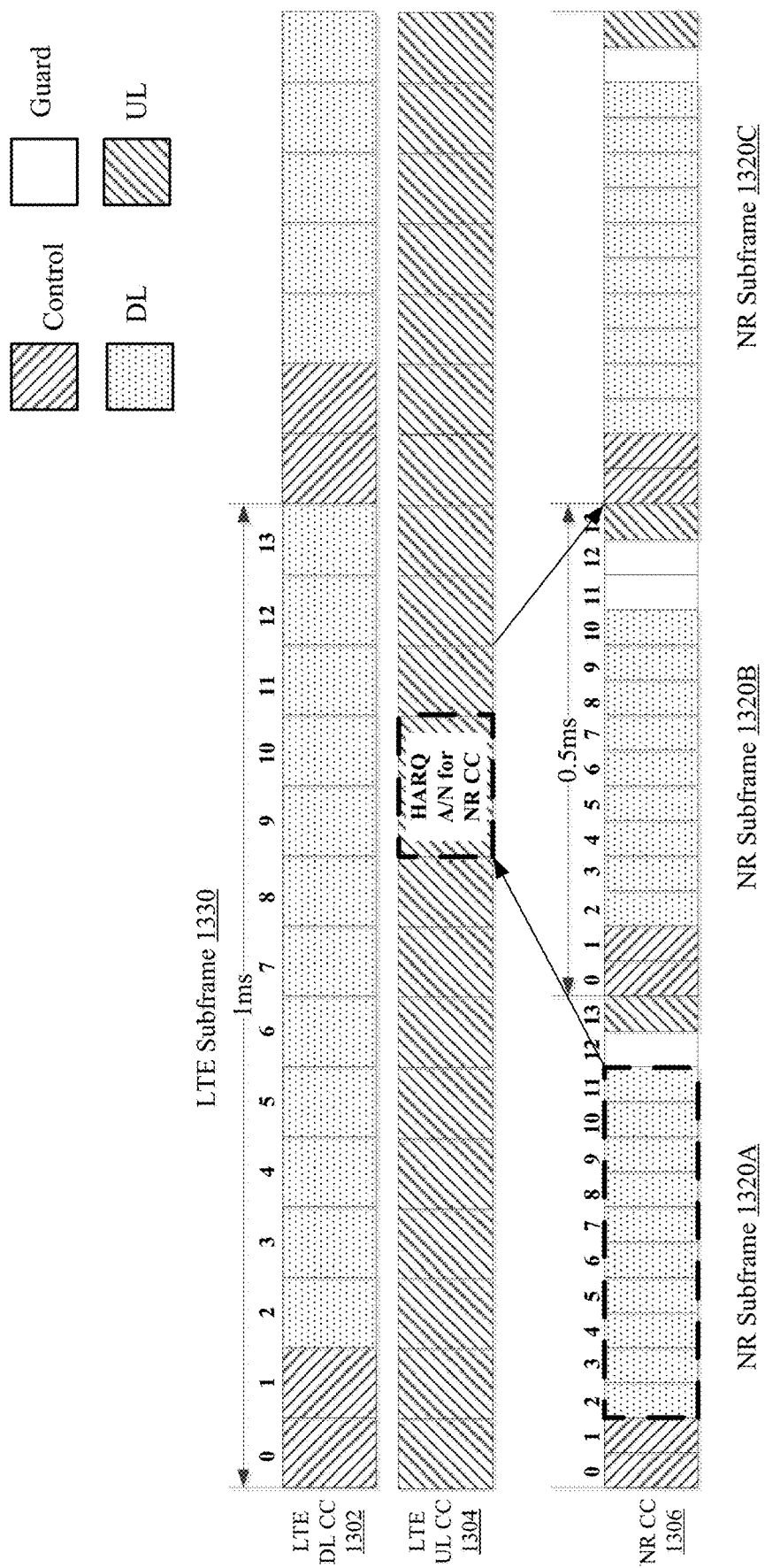
FIG. 13 illustrates an example of providing next subframe HARQ feedback for a NR CC, in accordance with certain aspects of the present disclosure.

FIG. 13 illustrates one example of the UE providing next subframe HARQ feedback for transmissions received from another node (e.g., BS, UE, etc.) (during a previous subframe) in a NR CC, according to certain aspects of the present disclosure. Similar to FIG. 12, in this example, one FDD CC in LTE, which is comprised of a DL CC 1302 and an UL CC 1304, is aggregated with a CC 1306 in NR, and the LTE UL CC 1304 is configured as the UL anchor CC. However, compared to FIG. 12, there may not be a large guard period configured for subframes 1320A, 1320B, 1320C of the NR CC 1306 (e.g., the UE may determine that the guard period does not satisfy a particular threshold, based on a configuration received from the BS). In some cases, when a 2 symbol TTI and/or 1 symbol TTI is configured for the LTE uplink CC 1304, the UE may be able to provide HARQ feedback in the UL anchor CC 1304 (for transmissions received in a prior NR subframe, e.g., NR subframe 1320A) during the next NR subframe (e.g., NR subframe 1320B). As shown in this example, the UE receives transmissions in symbols 2-11 of NR subframe 1320A of the NR CC 1306, and provides HARQ feedback (for the transmissions received in symbols 2-11 of NR subframe 1320A of the NR CC 1306) in symbols 9-10 of LTE UL CC 1304 during NR subframe 1320B.

In certain aspects, when the TTI duration in LTE is relatively long, the UE may not be able to provide HARQ feedback in the next subframe.

Figure 14A:
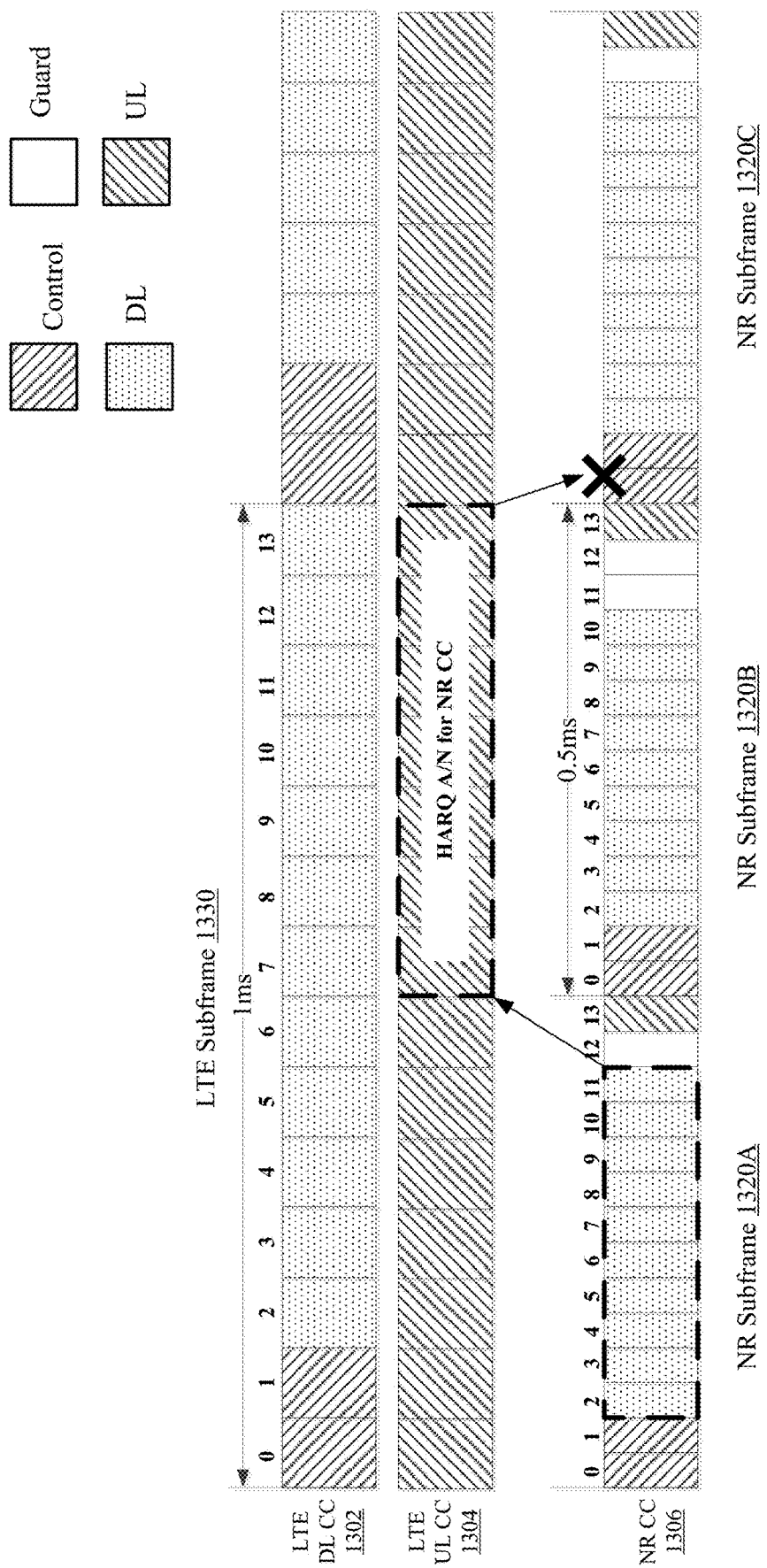
FIG. 14A illustrates an example scenario of missing next subframe HARQ feedback for a NR CC, in accordance with certain aspects of the present disclosure.

FIG. 14A illustrates one example of the UE missing a next subframe turn-around for a HARQ response (e.g., for a NR CC), according to certain aspects of the present disclosure. Similar to FIG. 13, in this example, one FDD CC in LTE, which is comprised of DL CC 1302 and UL CC 1304, is aggregated with a CC 1306 in NR, and the LTE UL CC is configured as the UL anchor CC. However, compared to FIG. 13, a slot TTI (e.g., 0.5 ms) (e.g., symbols 7-13 of the LTE subframe 1330) is configured for the LTE UL anchor CC. In such cases, when the UE receives transmissions in a first subframe of the NR CC, the UE may not be able to provide HARQ feedback for the transmissions until the third subframe of the NR CC. For example, as shown, after the UE receives transmissions in symbols 2-11 of NR subframe 1320A, the UE is not able to provide HARQ feedback (e.g., on LTE UL CC 1304) for the received transmissions until NR subframe 1320C.

Techniques presented herein, however, allow the UE to still provide next subframe HARQ feedback in such situations, for example, by omitting one or more slot TTI transmissions in one or more symbols of the LTE UL anchor CC.

Figure 14B:
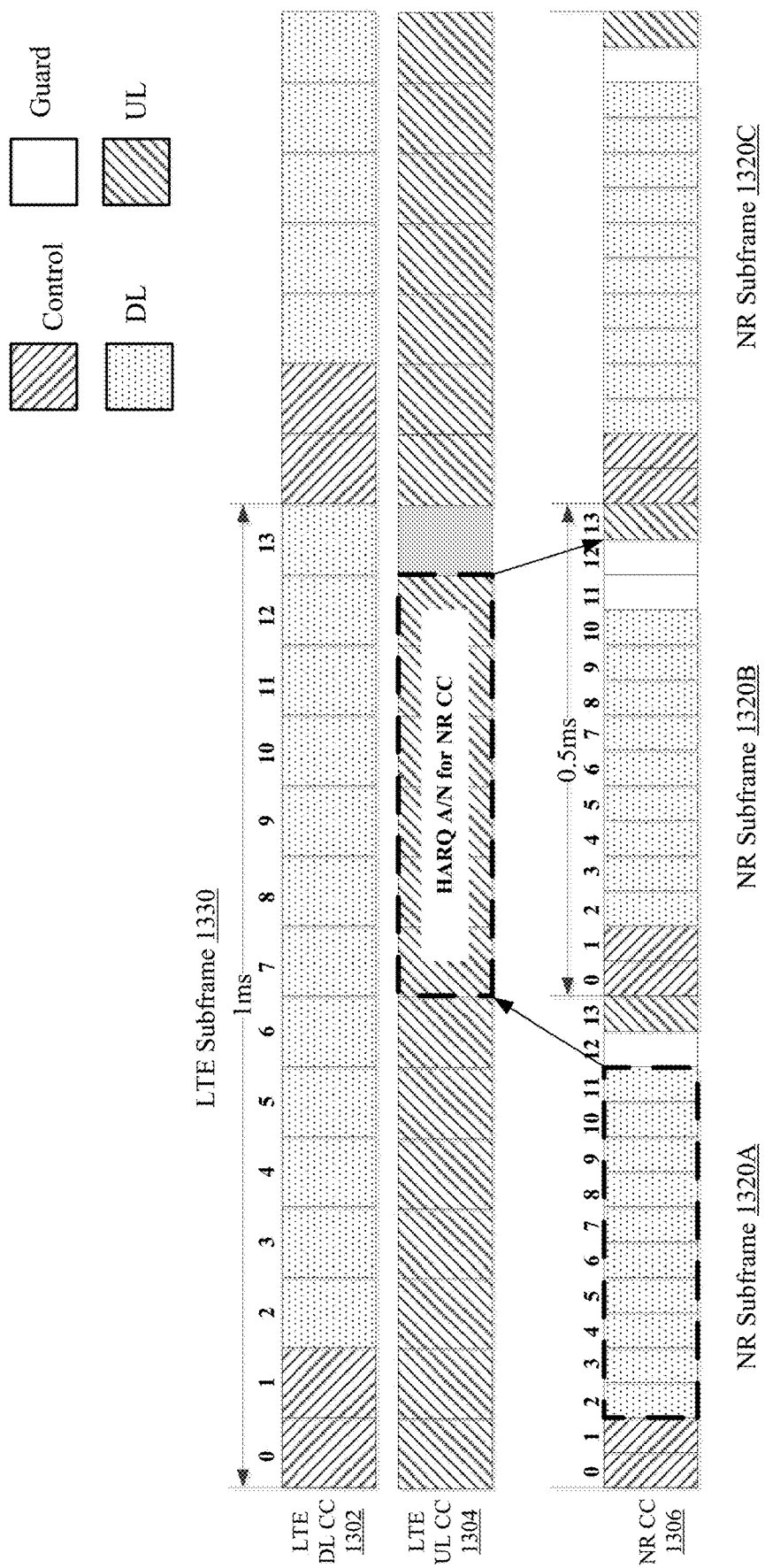
FIG. 14B illustrates an example scenario for omitting a slot transmission time interval (TTI) transmission in order to enable a next subframe HARQ response, in accordance with certain aspects of the present disclosure.

FIG. 14B illustrates one example of the UE omitting a slot TTI transmission in order to enable a next subframe HARQ response, according to certain aspects of the present disclosure. As shown in this example, compared to FIG. 14A, the UE omits the slot TTI transmission in the last symbol (e.g., symbol 13 of LTE subframe 1330) of the LTE UL anchor CC 1304 in order to provide HARQ feedback for the transmission received in the first subframe (e.g., NR subframe 1320A) of the NR CC 1306.

In some aspects, even when the UE does not omit a slot TTI transmission, the UE may still be able to provide a HARQ feedback response in the next subframe. For example, in current LTE, ACK/NAK may be piggybacked on PUSCH, which is generally located in the middle of the subframe. Thus, if ACK/NAK is transmitted on PUSCH, the UE may not have to omit a slot TTI transmission, as the receiving node (e.g., BS, UE) may have sufficient time to decode the UCI. In some cases, configuring a slot TTI transmission for the LTE anchor CC may provide better link efficiency compared to a two symbol TTI transmission. Thus, by allowing the UE to provide HARQ feedback in the next subframe for larger TTI durations, the UE may be able to increase the link efficiency for uplink transmissions.

Techniques presented herein also allow the UE to provide HARQ feedback for larger TTI durations (e.g., greater than 0.5 ms).

Figure 15A:
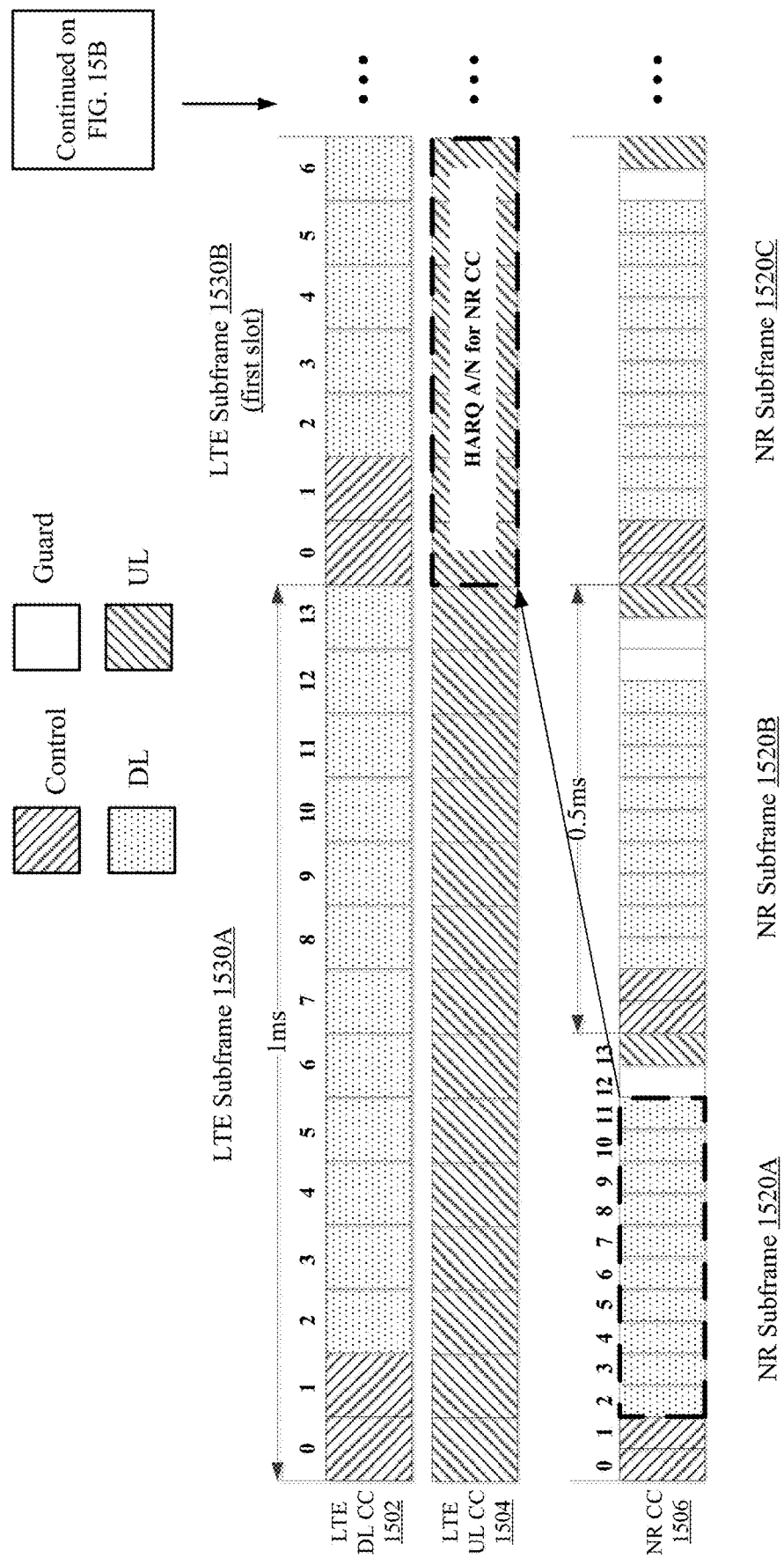
FIGS. 15A and 15B illustrates an example scenario for providing HARQ feedback for a LTE UL anchor carrier, in accordance with certain aspects of the present disclosure.
Figure 15B:
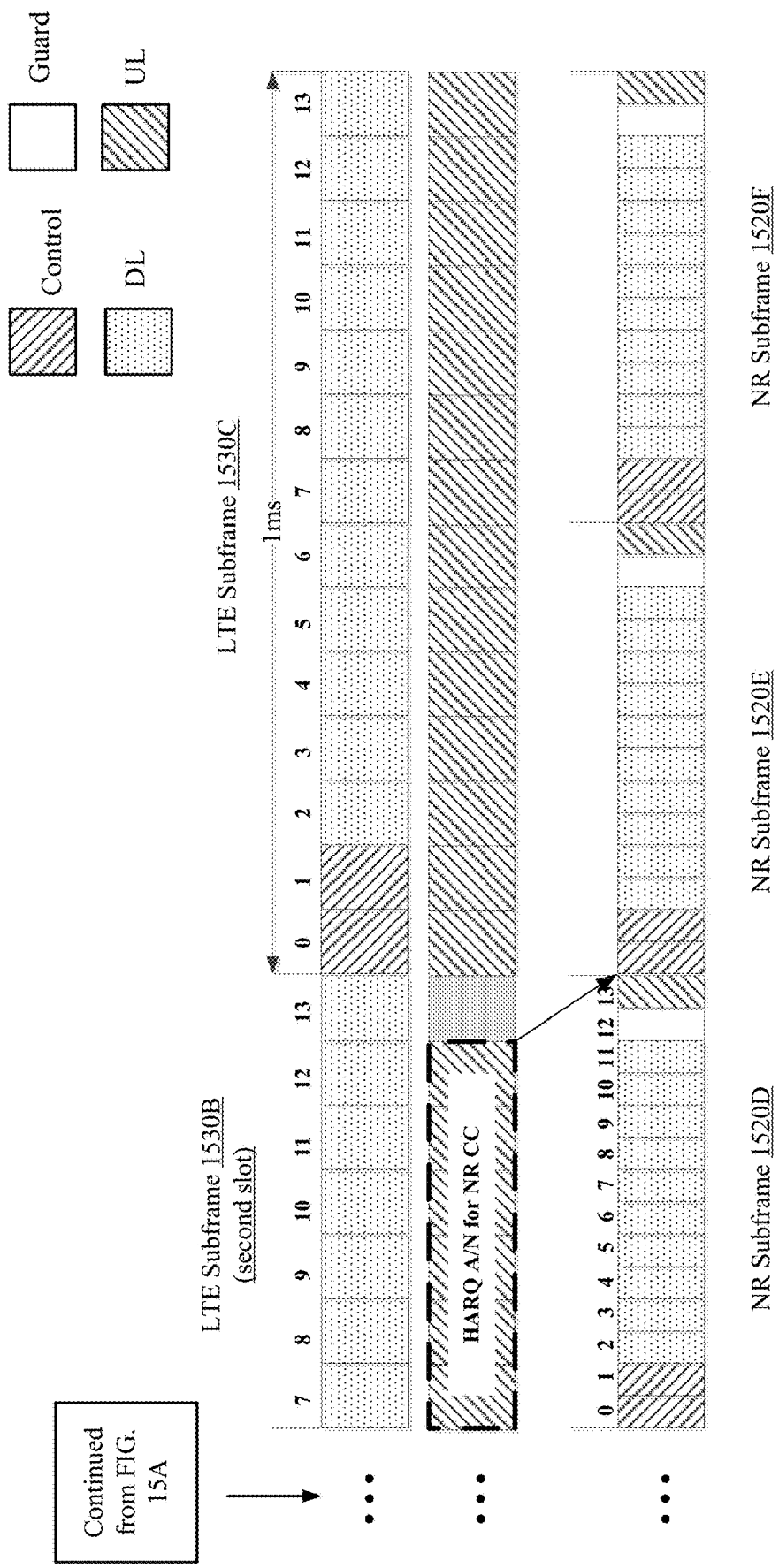

FIGS. 15A-15B illustrate an example of the UE providing HARQ feedback on an LTE UL anchor CC when a 1 ms TTI is configured for the LTE UL CC, according to certain aspects of the present disclosure. In this example, one FDD CC in LTE, which is comprised of DL CC 1502 and UL CC 1504, is aggregated with a CC 1506 in NR, and the LTE UL CC 1504 is configured as the UL anchor CC. Four LTE subframes 1530A-1530D are shown for the LTE FDD CC, and six NR subframes 1520A-F are shown for the NR CC.

In some aspects, the UE may be able to provide HARQ feedback on LTE UL CC 1504 (e.g., symbols 0-12 of LTE subframe 1530B) for transmissions received in the first subframe (e.g., NR subframe 1520A) of the NR CC 1506 during the fourth subframe (e.g., NR subframe 1520D) of the NR CC 1506. The UE may be able to provide the HARQ feedback during the NR subframe 1520D by omitting the TTI transmission in the last symbol (e.g., symbol 13) of LTE subframe 1530B of the LTE uplink CC (e.g., similar to FIG. 14B). That is, the UE may be able to achieve a 2 ms (or 4 NR subframes) gap for the NR HARQ response. In addition, in some cases, when transmitting ACK/NAK on PUSCH, the UE may be able to achieve similar timing without omitting the TTI transmission in the last symbol. With respect to PUCCH, the LTE uplink CC may be configured to use a shortened PUCCH format to allow scheduling of re-transmissions. Note that, although not shown, the subframe boundaries between the different CCs on LTE and NR do not have to be aligned. Thus, in one example, the 1 ms TTI duration configured for the LTE anchor CC may include the second slot of subframe n−1 and first slot of subframe n, which may help reduce latency for the NR CC.

Thus, as mentioned above, when the UE is configured with an LTE uplink anchor CC, the UE may be able to provide a same subframe HARQ response for NR when there is a large guard period configured for the NR CC and a 2-symbol TTI duration configured for LTE CC. The UE may be able to provide a next subframe HARQ response for NR when there is a slot-TTI duration (with last symbol empty) configured for the LTE CC (e.g., there may not be a restriction for NR). Additionally, the UE may be able to provide a HARQ response for NR within 4 subframes when there is a 1 ms TTI duration (with last symbol empty) configured for the LTE CC (with no restriction for NR).

According to certain aspects, the first RAT may be NR and the second RAT may be LTE. Thus, in such cases, one of the CCs in NR may be used as the UL anchor CC. Similar to the case where LTE was used for the UL anchor CC, there may be different combinations of multiplexing and multiple access technologies supported by the CCs in the different RATs. Further, while the UE may be configured with one of the CCs in NR as the UL anchor CC, the UE may be able to still transmit SRS in another UL CC (e.g., a LTE UL CC) for channel reciprocity based operations.

In some aspects, the NR UL anchor CC carrying UCI for LTE can be a channel in a common burst or a regular burst. Due, in part, to potentially large payload sizes for UCI associated with LTE CCs, the number of combinations of CCs between LTE and NR with NR configured as the anchor (or primary) UL CC may be reduced. For example, in some cases, the number of LTE CCs may be reduced, the configurations for LTE CC and/or NR CC may be reduced (i.e., some configurations, e.g., DL heavy configurations, may be excluded), HARQ ACK/NAK bundling may have to be enabled (e.g., time-domain bundling, CC-domain bundling, spatial domain bundling, etc.), etc.

Figure 16A:
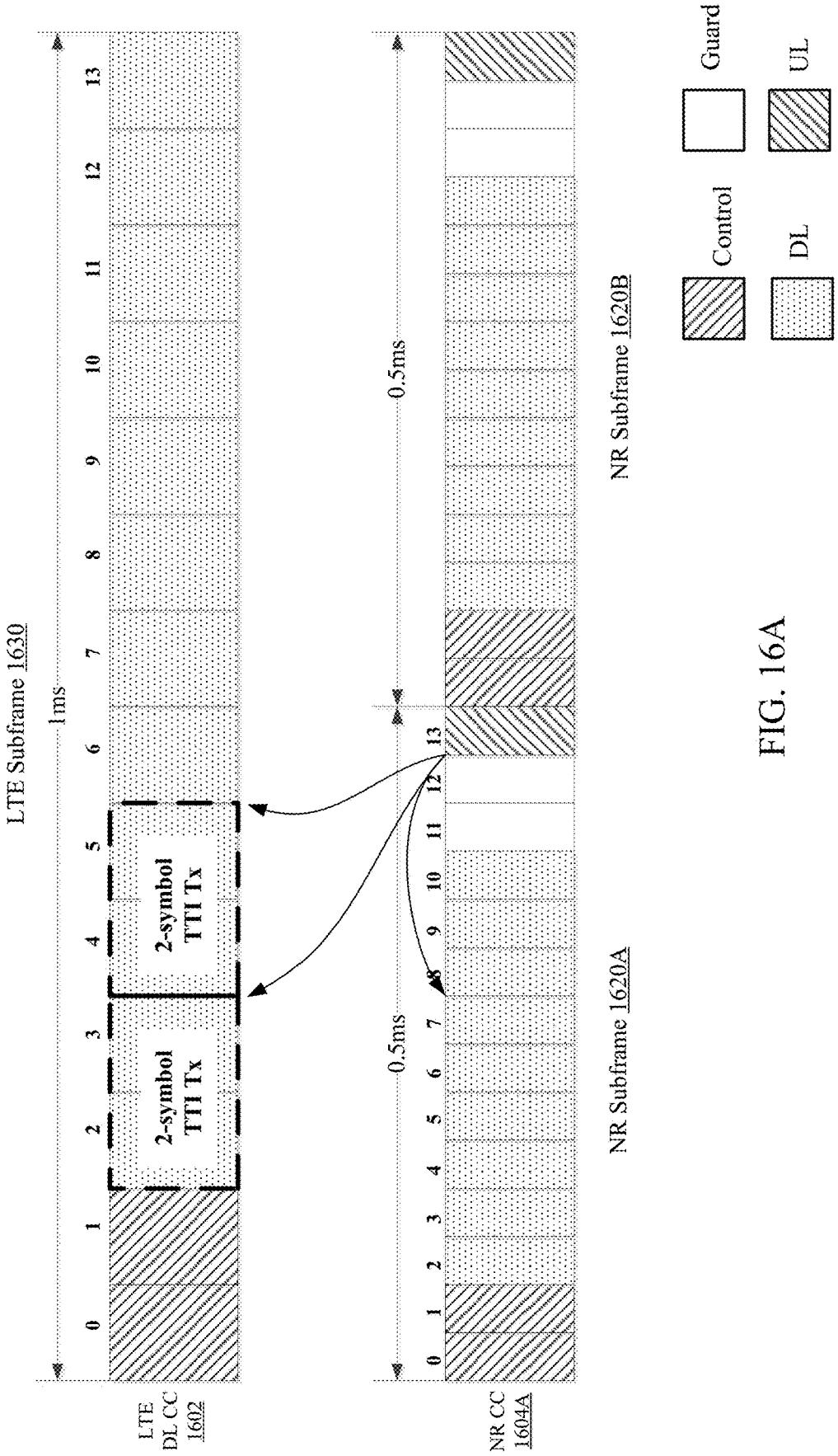
FIGS. 16A and 16B illustrate different examples of providing HARQ feedback in an NR anchor UL carrier, in accordance with certain aspects of the present disclosure.
Figure 16B:
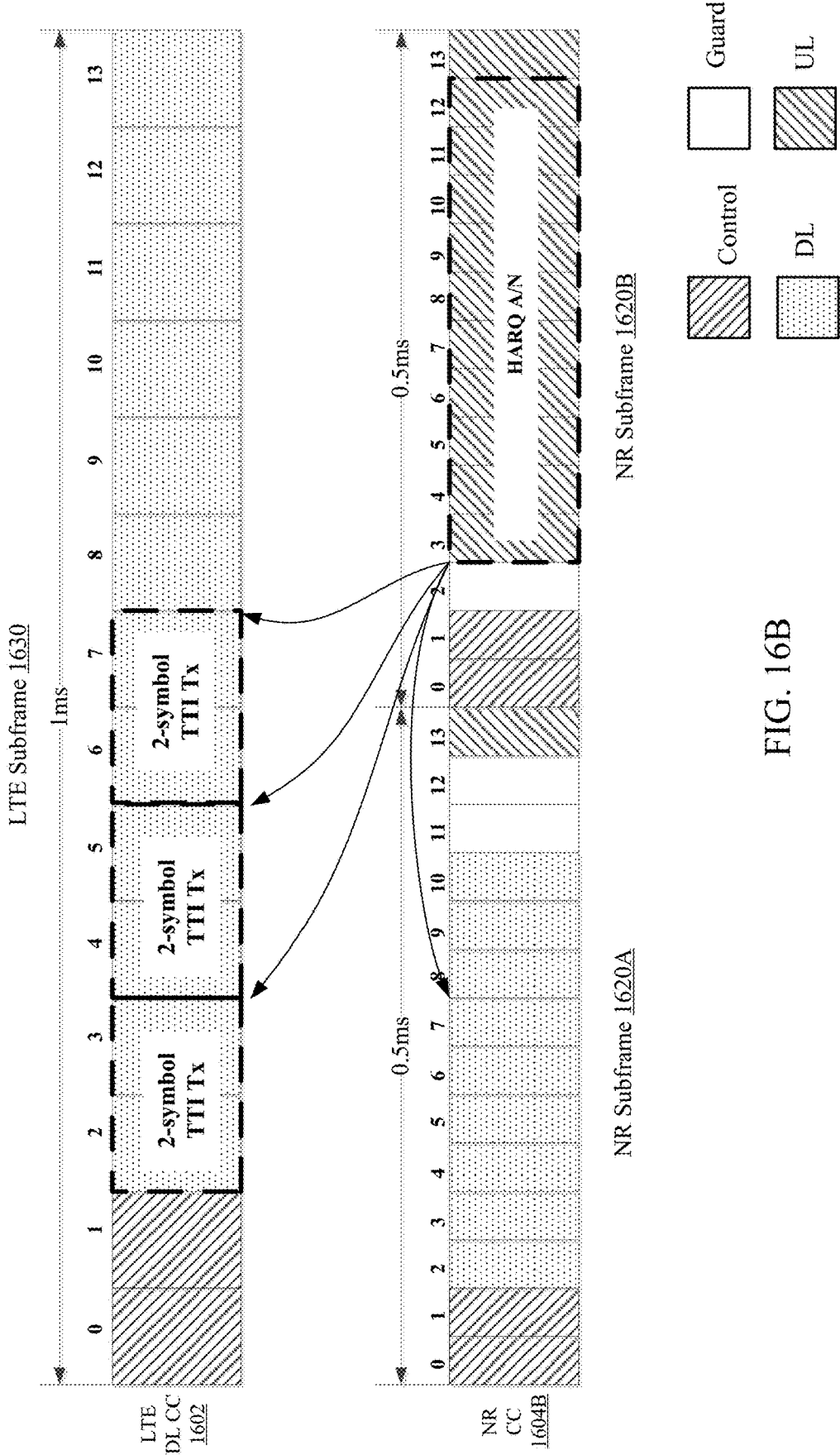

FIGS. 16A and 16B illustrate different examples of the UE providing HARQ feedback in an NR UL anchor CC (e.g., NR CC 1604) for transmissions received from another node (e.g., BS, UE, etc.) in a LTE DL CC (e.g., LTE DL CC 1602), according to certain aspects of the present disclosure. In particular, FIG. 16A illustrates an example where the NR UL anchor CC 1604A is configured as a common burst and FIG. 16B illustrates an example where the NR UL anchor CC 1604B is configured as a regular burst.

When the NR UL anchor CC (e.g., NR UL anchor CC 1604A) is configured as a common burst channel, the UE may not have enough room to provide HARQ feedback for UCI payloads associated with downlink transmissions received from the LTE CC. For example, as shown in FIG. 16A, the UE may be left with a single symbol (symbol 13 of NR subframe 1620A) in NR CC to provide HARQ feedback. However, this single symbol may not be enough to provide HARQ feedback for transmissions received in symbols 2-5 of LTE subframe 1630 on LTE DL CC 1602 and/or for transmissions received in one or more of symbols 2-10 of NR subframe 1620A on NR CC 1604A. On the other hand, when the NR UL anchor CC (e.g., NR UL anchor CC 1604B) is configured as a regular burst channel (e.g., the channel is in an uplink heavy configuration), the UE may have more room to provide HARQ feedback for large UCI payloads. For example, as shown in FIG. 16B, the UE may use symbols 3-12 of NR subframe 1620B of NR CC 1604B to provide HARQ feedback for transmissions received in symbols 2-7 of LTE subframe 1630 on LTE DL C 1602 and/or for transmissions received in one or more of symbols 2-10 of NR subframe 1620A on NR CC 1604B.

According to certain aspects, as noted above, the UE and/or BS may also switch the UL anchor CC from a LTE CC to a NR CC (and vice versa). In certain aspects, such switching can be based on a configuration, one or more defined rules, a dynamic indication, etc. In certain aspects, such switching can be based on UL resource availability, channel conditions, SRS switching, NR subframe structures (e.g., whether DL/UL centric, tone spacings, etc.), and the like, in the different RATs.

In some cases (e.g., such as in LTE Rel-14, which supports SRS switching), as mentioned above, a UE can be configured (or receive an indication) to transmit SRS on a CC where the CC is not configured as part of the UL anchor CC. Further, in NR, it may be possible to allow for switching data/control in addition to SRS. However, even if the UE is capable of using two or more UL CCs, the UE may still determine to use a single UL CC at a time. The UE, for example, in response to one or more conditions can determine to switch transmissions of one or more of PUSCH, PUCCH, SRS, etc. from one CC of a RAT to another CC of a different RAT in different time instances. The one or more conditions can include at least one of a SRS configuration, a UL grant, a DL grant, a dynamic indication, resource availability in the CCs of the different RATs, etc.

In some cases, the UCI can be jointly managed on the UL CC. Alternatively, the UCI can be separately managed. That is, when the LTE CC is used as the UL anchor CC, it may carry UCI for LTE CCs and when the NR CC is used as the UL anchor CC, it may carry UCI for NR CCs.

Figure 17:
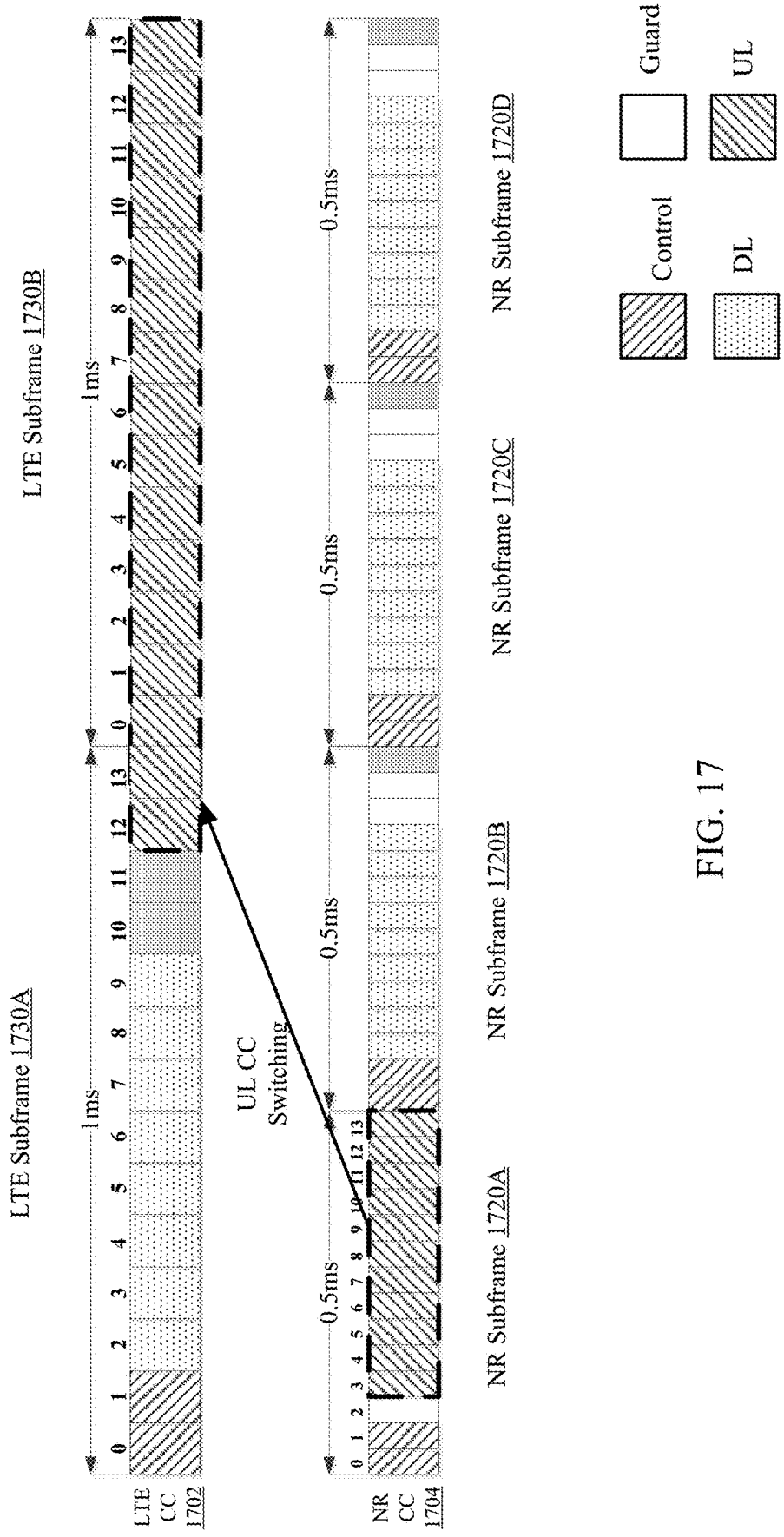
FIG. 17 illustrates an example of a subframe dependent UL anchor CC for LTE and NR, in accordance with certain aspects of the present disclosure.

FIG. 17 illustrates one example of a subframe dependent UL anchor CC for LTE and NR, according to certain aspects of the present disclosure. In this example, the UE may initially use the NR CC 1704 as the UL anchor CC (e.g., symbols 3-13 of the first subframe 1720A of the NR CC 1704), and then switch to using the LTE CC 1702 (e.g., during a later time) as the UL anchor CC. As shown, the UE may switch to using the LTE CC 1702 as the UL anchor CC during symbols 12-13 of the first subframe 1730A and symbols 0-13 of the second subframe 1730B of the LTE CC 1702. In this example, the UE may use 2 symbols to carry at least one of SRS, PRACH, shortened PUSCH, shortened PUCCH, etc. Note that the switching to a different uplink CC may or may not be aligned with the LTE subframe boundary. Put differently, the UE can decide per symbol or per TTI (e.g., as opposed to per subframe) whether to switch to a different uplink CC.

According to certain aspects, techniques presented herein can provide for a "virtual FDD" operation with LTE and NR in CA. Put differently, the CA can be such that the usage of LTE for NR can create an effective FDD operation for NR if the NR is TDD. For example, if NR is UL, LTE can be DL or UL. Similarly, if NR is DL, LTE UL can be utilized. Occasionally, the UE may still transmit SRS from NR carriers.

According to certain aspects, techniques herein may provide for flexible duplex mode by having NR embedded in LTE. For example, in a FDD LTE system, if DL is configured as LTE, the UL may be a mixture of LTE and NR (e.g., the UL may be TDM between LTE and NR).

Alternatively, in some aspects, LTE and NR may be separate (e.g., neither CA or DC) operations with some power control enhancements. For example, although the two different RATS may not be configured with DC, aspects herein may support a mutual power headroom report (PHR).

In one example, power headroom provides an indication of how far from the rated power the apparatus has to operate before it enters a non-linear region of operation. Put differently, the PHR may indicate how much transmission power is left for the UE to use in addition to the power being used by a current transmission. In some RATs, the device accessing the network periodically sends a PHR to inform the base station how much power it has available for future transmissions. The base station, in turn, may use the PHR to determine how much more uplink bandwidth per subframe the UE is capable of using. As used herein, a mutual PHR generally means that when the UE reports PHR for NR (or LTE), it may also report PHR (e.g., a companion PHR) for LTE (or NR). Compared with a semi-static power split, such a mutual PHR may improve power management in the system. Additionally, the UE may also provide feedback to NR eNB of LTE SPS configuration, such that the NR eNB can perform improved power management. For example, every 20 ms (if LTE SPS periodicity is configured to be 20 ms), the NR eNB may reserve some power for LTE SPS.

According to certain aspects, techniques presented herein also allow multiplexing LTE and/or NR RATs on the same CC. In one aspect, the multiplexing may be similar to NR that is configured in different numerologies in a FDM, TDM, or combination of TDM and FDM. For example, in this aspect, the CC may be configured for LTE in a first time instance, and NR in a second time instance. In one example, the CC may be configured for LTE in a first subband of a time instance, while the CC is configured for NR in a second subband of the time instance. In this case, if the numerology for the LTE CC(s) and the NR CC(s) are different (e.g., 15 kHz tone spacing in LTE vs. 30 kHz tone spacing in NR), a guard band may be placed in between the subbands for LTE and the subbands for NR in order to minimize mutual interference.

Note that in some cases the single UL CC described herein may refer to a subset of UL transmissions, while other UL transmissions may be on multiple CCs simultaneously. For example, multi-CC SRS may be transmitted simultaneously, while PUCCH or PUSCH is on one CC. In one example, multi-CC SRS and/or multi-CC PUSCH may be transmitted simultaneously, and UCI may be transmitted on one CC (e.g., either PUCCH or PUSCH).

Note that while much of the above description uses CA operation to describe how the techniques presented herein for uplink communications can be applied when LTE is integrated with NR (e.g., in CA), note that the techniques presented herein can also be applied when LTE is integrated with NR in dual-connectivity (DC) operations. For example, the techniques presented herein may also allow for a single UL CC with LTE and NR in DC. In one case, for example, the UL CC can handle UCI for the two cell groups in DC in a TDM manner.

Further, note that while much of the above description uses a 0.5 ms subframe duration for NR as a reference example, other subframe durations (e.g., 0.25 ms and others) may be possible. In such cases, those of ordinary skill in the art will understand how to use the techniques presented herein to determine the HARQ timing between the two different RATs (e.g., to the extent the numerology between the different RATs differs from the examples presented herein).

Advantageously, using a single CC for uplink transmissions when LTE and NR are integrated in a communication system can improve uplink transmission efficiency, reduce costs, etc. A single UL CC, for example, may help to minimize UL transmit power backoff. That is, a single UL CC may help to minimize peak to average power ratio (PAPR)/maximum power reduction (MPR), which can make it easier for the UE to satisfy emission requirements. Additionally, with a single UL CC, a UE may be able to jointly manage uplink control information (UCI) (e.g., HARQ, ACK/NAK, CSI, etc.) for multiple downlink CCs, which can improve efficiency. Further, when a single UL CC handles the UL traffic, uplink link efficiency may be improved.

In some cases, there may be situations where a single UL CC may not be used (e.g., when there is a heavy uplink traffic demand—two or more UL CCs). However, even in such cases, there can still be a tradeoff between using high order MIMO (e.g., a greater a number of layers per UL CC) with one UL CC and using less order MIMO (e.g., less number of layers per UL CC) with two or more UL CCs. Additionally, as described above, the UL CC does not have to be fixed on a particular RAT. That is, the UL CC may not be a semi-static CC, but may be switched from a first CC to a second CC dynamically. Even when switching between different RATs, however, the techniques presented herein can achieve limited impact on DL throughput and latency. For example, although there may be a single UL CC configured for the UE, the UE may still be able to transmit SRS on different uplink CCs (e.g., in order to enable channel reciprocity based operation).

In addition, there may be one or more benefits (e.g., in terms of cost, implementation, and/or deployment considerations) to using a single UL CC for LTE integrated with NR. For example, using a single UL CC allows for one single Tx chain (e.g., as opposed to multiple Tx chains). However, even with one single Tx chain, it may still be possible with the techniques described herein to have a separate phase locked loop (PLL) circuit to enable fast RF re-tuning from one UL CC to another UL CC (e.g., to transmit SRS). The techniques presented herein can also provide a good tradeoff between CA and UL MIMO. For example, instead of using two CCs with up to rank 2 UL MIMO, it may be possible with the techniques herein to use one CC with up to rank 4 UL MIMO.

Further yet, the techniques presented herein may allow for one or more different deployment scenarios. For example, a macro cell can deployed for LTE and one or more small cells deployed for NR, where LTE is configured as the UL anchor CC. In one example, there may be one or more small cells deployed for LTE and one or more small cells deployed for NR, where either LTE or NR is configured as the UL anchor CC. In one example, a macro cell initially deployed for LTE may migrate to NR and there may be one or more small cells deployed to LTE and/or NR, where NR is configured as the UL anchor CC. In general, however, there may be any combination of cells deployed to different numbers of RATs in a network, and any one of the RATs may be configured as the UL anchor CC.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' 'sending,' and/or other related or suitable aspects without necessarily deviating from the scope of the present disclosure.

Although the examples described herein (e.g., with reference to FIG. 10) may describe certain features, operations, processes, methods, and/or aspects from the perspective of a subordinate entity 204 (e.g., UE), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure. Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or a processor. Generally, where there are operations illustrated in figures, those operations may have corresponding counterpart means-plus-function components with similar numbering.

For example, means for configuring, means for grouping, means for performing power scaling, means for determining, means for identifying, means for aligning, means for omitting, means for configuring, means for transmitting, means for communicating, means for sending, means for providing, means for reporting, means for receiving, means for switching and/or means for scheduling may comprise a processing system, which may include one or more processors, such as the processor(s) 304 of the scheduling entity 202 illustrated in FIG. 3, and/or the processor(s) 404 of the subordinate entity 204 illustrated in FIG. 4. Additionally, means for transmitting, means for receiving, means for sending, means for providing, means for communicating may comprise one or more transceivers, such as the transceiver 310 of the scheduling entity 202 or the transceiver 410 of the subordinate entity 204.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining a configuration of one or more component carriers (CCs) of a first radio access technology (RAT) and one or more CCs of a second RAT, wherein the first RAT is different from the second RAT;
    identifying one of the CCs of the first RAT as an uplink anchor CC based on the configuration;
    identifying a hybrid automatic repeat request (HARQ) timing for at least one of the CCs of the second RAT based on at least one of a symbol duration, a transmit time interval (TTI) length or a subframe structure of the one of the CCs of the first RAT;
    receiving one or more transmissions in a first subframe of one of the CCs of the second RAT;
    determining between sending feedback in the identified uplink anchor CC of the first RAT during the first subframe of the one of the CCs of the second RAT and sending the feedback during a second subframe of the one of the CCs of the second RAT based, at least in part, on a guard period of the one or more CCs of the second RAT and, a symbol duration or a TTI duration, configured for the first RAT; and
    sending the feedback to a node in the identified uplink anchor CC of the first RAT during the first or second subframe based on the determination.

2. The method of claim 1, wherein the first RAT comprises long term evolution (LTE) and the second RAT comprises new radio (NR).

3. The method of claim 1, wherein determining between sending the feedback during the first subframe or the second subframe comprises determining to send the feedback during the second subframe when the symbol duration or the TTI duration is greater than a threshold.

4. The method of claim 3, wherein sending the feedback during the second subframe comprises omitting a transmission in at least one symbol of the uplink anchor CC.

5. The method of claim 1, wherein the second subframe is adjacent to the first subframe.

6. The method of claim 1, wherein the first RAT comprises new radio (NR) and the second RAT comprises long term evolution (LTE).

7. The method of claim 6, wherein sending the feedback to the node in the identified uplink anchor CC comprises sending the feedback in a common burst channel or a regular burst channel.

8. The method of claim 1, further comprising determining whether to switch the uplink anchor CC from the first RAT to the second RAT.

9. The method of claim 8, wherein determining whether to switch the uplink anchor CC is based on at least one of channel conditions, availability of uplink resources, or a subframe structure associated with the CCs of the first and second RATs.

10. The method of claim 8, wherein determining whether to switch the uplink anchor CC is based on an indication from the node.

11. The method of claim 1, wherein the CCs of the first and second RATs are in one of a carrier aggregation (CA) mode or a dual connectivity (DC) mode.

12. The method of claim 1, further comprising:
    determining to report a power headroom report (PHR) for at least one CC of one of the first and second RATs; and
    reporting a companion PHR for at least one CC of the other one of the first and second RATs.

13. An apparatus for wireless communication, comprising:
    means for determining a configuration of one or more component carriers (CCs) of a first radio access technology (RAT) and one or more CCs of a second RAT, wherein the first RAT is different from the second RAT;

means for identifying one of the CCs of the first RAT as an uplink anchor CC based on the configuration;

means for identifying a hybrid automatic repeat request (HARQ) timing for at least one of the CCs of the second RAT based on at least one of a symbol duration, a transmit time interval (TTI) length or a subframe structure of the one of the CCs of the first RAT;

means for receiving one or more transmissions in a first subframe of one of the CCs of the second RAT;

means for determining between sending feedback in the identified uplink anchor CC of the first RAT during the first subframe of the one of the CCs of the second RAT and sending the feedback during a second subframe of the one of the CCs of the second RAT based, at least in part, on a guard period of the one or more CCs of the second RAT and, the symbol duration or the TTI duration, configured for the first RAT; and means for sending the feedback to another apparatus in the identified uplink anchor CC of the first RAT during the first or second subframe based on the determination.

14. The apparatus of claim 13, wherein the first RAT comprises long term evolution (LTE) and the second RAT comprises new radio (NR).

15. The apparatus of claim 13, wherein the means for determining determines to send the feedback during the second subframe when the symbol duration or the TTI duration is greater than a threshold.

16. The apparatus of claim 15, wherein means for sending the feedback during the second subframe comprises means for omitting a transmission in at least one symbol of the uplink anchor CC.

17. The apparatus of claim 13, wherein the second subframe is adjacent to the first subframe.

18. The apparatus of claim 13, wherein the first RAT comprises new radio (NR) and the second RAT comprises long term evolution (LTE).

19. The apparatus of claim 18, wherein means for sending the feedback to the other apparatus in the identified uplink anchor CC comprises means for sending the feedback in a common burst channel or a regular burst channel.

20. The apparatus of claim 13, further comprising means for determining whether to switch the uplink anchor CC from the first RAT to the second RAT.

21. The apparatus of claim 20, wherein the means for determining whether to switch the uplink anchor CC is based on at least one of channel conditions, availability of uplink resources, or a subframe structure associated with the CCs of the first and second RATs.

22. The apparatus of claim 13, wherein the CCs of the first and second RATs are in one of a carrier aggregation (CA) mode or a dual connectivity (DC) mode.

23. An apparatus for wireless communication, comprising:
at least one processor configured to:
determine a configuration of one or more component carriers (CCs) of a first radio access technology (RAT) and one or more CCs of a second RAT, wherein the first RAT is different from the second RAT;
identify one of the CCs of the first RAT as an uplink anchor CC based on the configuration;
identify a hybrid automatic repeat request (HARQ) timing for at least one of the CCs of the second RAT based on at least one of a symbol duration, a TTI length, or a subframe structure of the one of the CCs of the first RAT;
receive one or more transmissions in a first subframe of one of the CCs of the second RAT;
determine between sending feedback in the identified uplink anchor CC of the first RAT during the first subframe of the one of the CCs of the second RAT and sending the feedback during a second subframe of the one of the CCs of the second RAT based, at least in part, on a guard period of the one or more CCs of the second RAT, and, a symbol duration or a TTI duration, configured for the first RAT; and
sending the feedback to a node in the identified uplink anchor CC of the first RAT during the first or second subframe based on the determination; and
a memory coupled to the at least one processor.

24. A non-transitory computer-readable medium having computer executable code stored thereon for:
determining a configuration of one or more component carriers (CCs) of a first radio access technology (RAT) and one or more CCs of a second RAT, wherein the first RAT is different from the second RAT;
identifying one of the CCs of the first RAT as an uplink anchor CC based on the configuration;
identifying a hybrid automatic repeat request (HARQ) timing for at least one of the CCs of the second RAT based on at least one of a symbol duration, a transmit time interval (TTI) length, or a subframe structure of the one of the CCs of the first RAT; and
receiving one or more transmissions in a first subframe of one of the CCs of the second RAT;
determining between sending feedback in the identified uplink anchor CC of the first RAT during the first subframe of the one of the CCs of the second RAT and sending feedback during a second subframe of the one of the CCs of the second RAT based, at least in part, on a guard period of the one or more CCs of the second RAT, and, a symbol duration or a TTI duration, configured for the first RAT; and
sending the feedback to a node in the identified uplink anchor CC of the first RAT during the first or second subframe based on the determination.

* * * * *